United States Patent [19]

Seraji

[11] Patent Number: 5,550,953
[45] Date of Patent: Aug. 27, 1996

[54] ON-LINE METHOD AND APPARATUS FOR COORDINATED MOBILITY AND MANIPULATION OF MOBILE ROBOTS

[75] Inventor: Homayoun Seraji, La Crescenta, Calif.

[73] Assignee: The United States of America as represented by the Administrator of the National Aeronautics and Space Administration, Washington, D.C.

[21] Appl. No.: 231,597

[22] Filed: Apr. 20, 1994

[51] Int. Cl.$^6$ ............................. G05B 15/00; G05B 19/00
[52] U.S. Cl. ................................. 395/98; 395/97; 395/80; 901/15
[58] Field of Search ....................... 364/474.36, 167.01; 395/80–98; 901/14, 15

[56] References Cited

U.S. PATENT DOCUMENTS

| | | | |
|---|---|---|---|
| 4,483,407 | 11/1984 | Iwamoto et al. | 180/9.5 |
| 4,590,578 | 5/1986 | Barto, Jr. et al. | 364/513 |
| 4,702,661 | 10/1987 | Bisiach | 414/460 |
| 4,706,204 | 11/1987 | Hattori | 364/513 |
| 4,804,897 | 2/1989 | Gordon et al. | 318/568 |
| 4,853,603 | 8/1989 | Onoue et al. | 318/568.15 |
| 4,894,595 | 1/1990 | Sogawa et al. | 318/568.24 |
| 4,937,511 | 6/1990 | Herndon et al. | 318/568.21 |
| 4,937,759 | 6/1990 | Vold | 395/98 |
| 4,954,762 | 9/1990 | Miyake et al. | 318/568.19 |
| 5,021,878 | 6/1991 | Lang | 358/93 |
| 5,031,109 | 7/1991 | Gloton | 364/478 |
| 5,155,423 | 10/1992 | Karlen et al. | 318/568.11 |
| 5,156,513 | 10/1992 | Galan et al. | 414/273 |
| 5,157,315 | 10/1992 | Miyake et al. | 318/568.11 |
| 5,245,263 | 9/1993 | Tsai et al. | 318/568.1 |
| 5,260,629 | 11/1993 | Ioi et al. | 318/568.19 |

OTHER PUBLICATIONS

Miksch et al, "performance–functional based controller design for a mobile manipulator"; Proceedings of the 1992 IEEE International conference on robotics and automation, pp. 227–232, May 1992.

Seraji, "An on–line approach to coordinated mobility and manipulation"; Proceedings of the 1993 IEEE International conference on robotics and automation, pp. 28–35, May 1993.

Carriker et al, "An approach for coordinating mobility and manipulation"; IEEE international conference on systems engineering, pp. 59–63, 24–26 Aug. 1989.

Skaar et al, "Nonholonomic camera–space manipulation"; IEEE Transactions on robotics and automation, pp. 464–479, vol. 8, No. 4, Aug. 1992.

Murphy et al, "simulation of cooperating robot manipulators on a mobile platform"; IEEE Transactions on robotics and automation, pp. 468–478, vol. 7, No. 4, Aug. 1991.

Primary Examiner—Robert W. Downs
Assistant Examiner—Tariq R. Hafiz
Attorney, Agent, or Firm—John H. Kusmiss

[57] ABSTRACT

A simple and computationally efficient approach is disclosed for on-line coordinated control of mobile robots consisting of a manipulator arm mounted on a mobile base. The effect of base mobility on the end-effector manipulability index is discussed. The base mobility and arm manipulation degrees-of-freedom are treated equally as the joints of a kinematically redundant composite robot. The redundancy introduced by the mobile base is exploited to satisfy a set of user-defined additional tasks during the end-effector motion. A simple on-line control scheme is proposed which allows the user to assign weighting factors to individual degrees-of-mobility and degrees-of-manipulation, as well as to each task specification. The computational efficiency of the control algorithm makes it particularly suitable for real-time implementations. Four case studies are discussed in detail to demonstrate the application of the coordinated control scheme to various mobile robots.

14 Claims, 20 Drawing Sheets

ON-LINE METHOD AND APPARATUS FOR COORDINATED MOBILITY AND MANIPULATION OF MOBILE ROBOTS

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to a new method and apparatus for providing a simple and computationally efficient approach for on-line coordinated control of mobile robots consisting of a manipulator arm mounted on a mobile base. The redundancy introduced by the mobile base is used to satisfy a set of user-defined additional tasks during the end-effector motion. A simple on-line control scheme has been developed that allows the user to assign weighting factors to individual degrees-of-mobility and degrees-of-manipulation, as well as to each task specification. The computational efficiency of the control algorithm makes it particularly suitable for real-time implementations.

BACKGROUND ART

Conventional robots are mounted on a stationary base bolted to the floor so that they can withstand the forces and torques applied to the base when the arm carries a payload. Nowadays, with the availability of low-cost high-performance computers, real-time control algorithms can be implemented for mobile-base robots. Base mobility extends the reach of the manipulator arm considerably, and hence increases the size of the robot workspace substantially at a low cost. The base mobility can take different forms and four common implementations are:

(i) Tracked Robots: The robot base is mounted on a platform that can move back and forth along a track installed on the floor. Welding and painting robots are the most common tracked robots;

(ii) Gantry Robots: The robot is mounted on an overhead gantry that provides mobility in two horizontal directions and one vertical direction. These robots can carry very large payloads and can operate where floor space is critical;

(iii) Wheeled Robots: The robot is mounted on a vehicle that can move on wheels. Examples of this class are the microrovers planned for space exploration;

(iv) Compound Robots: The robot base is supported by another robot manipulator bolted to a fixed structure. The inner robot is typically a crane arm used as a crude positioning device. This robot has a large work envelope, slow movement characteristics, a high payload handling capacity, and is often referred to as the "marco" manipulator. The outer robot is a smaller and lighter manipulator that can provide dexterous manipulation with fast and precise movement capability, and is often called the "micro" manipulator. The robot system planned for the Space Station Freedom is a compound macro/micro manipulator.

A search of the prior art has revealed the following U.S. Pat. Nos.:

4,483,407 Iwamoto et al
4,590,578 Barto Jr. et al
4,702,661 Bisiach
4,706,204 Hattori
4,804,897 Gordon et al
4,853,603 Onoue et al
4,894,595 Sogawa et al
4,937,511 Herndon et al
4,954,762 Miyake et al
5,021,878 Lang
5,031,109 Gloton
5,155,423 Karlen et al
5,156,513 Galan et al
5,157,315 Miyake et al
5,245,263 Tsai et al
5,260,629 Ioi et al Of the aforementioned patents, the following appear to be relevant:

U.S. Pat. No. 4,590,578 to Barto Jr. et al is directed to an off-line programmable robot, As FIG. 1 shows, robot 10 having articulated arm 12 is fixed on base 22 which, in turn, is mounted on carriage track 40. A single controller, controller 70, controls both the motion of articulated arm 12 about the six axes 14–19, as well as the movement of the base along a seventh axis 42. In order to maintain accuracy in the location of the machine operations on workpiece 34, controller 70 performs "on the fly" determination of the positional relationships between workpiece 34, fixture 36, touch blocks 43–48, track 40, and robot 10.

U.S. Pat. No. 4,954,762 to Miyake et al is directed to a method and apparatus by which the tracking path of an industrial robot relative to other movable elements is controlled. As FIG. 1 shows, robot 1 is mounted on travelling stand vehicle 2 which is movably mounted on stand base 20. A single microprocessor 61 controls the relative orientation of robot arms 10, 11, 12 and 13 which manipulate welding torch 30; travelling stand vehicle 2; and positioner 4 which holds working object 5. Thus, manipulation of robot 1 and its translational movement are under real time coordinated control, as in the disclosed concept.

U.S. Pat. No. 4,894,595 to Sogawa et al is directed to an industrial robot. As FIG. 1 shows, the industrial robot comprises arm arrangement 1 supported on base 3 with drive units 3X, 3Y and 3Z, defining the mechanical interface between the two. Control unit 5 which includes command section 7 and position designation device 6, as shown in FIG. 2, coordinates the movement of robot arm 1, hand 2, and driven members 4A and 4B about their respective axes of motion. Here again, one controller commands the translational and manipulator movements of a robot arm.

U.S. Pat. No. 5,260,629 to Ioi et al is directed to a control device for a robot in an inertial coordinate system. As FIG. 2 diagrams, the control device operates on a system comprising robot 1 with a number of arms 3 and body 2, each of which have multiple degrees of freedom. The approach essentially is to measure the velocity or acceleration of robot body 2 with accelerometer 14 contained therein, then to add that measured parameter to a desired value expressed in absolute coordinates so as to command the robot arm to follow any desired path within that absolute coordinate system. Thus, translation of robot body 2 and the movement of robot arm 1 are coordinated, within a common coordinate system.

U.S. Pat. No. 5,156,513 to Galan et al is directed to an apparatus for handling clothes on hangers. As shown in FIG. 1, the apparatus is basically an auto-guided vehicle with manipulators for the controlled handling of clothes on a hanger. The relevance to your concept here is that control of auto-guided vehicle 2, article arm 4, horizontal arm 5, and clamp 6 is provided by a common onboard computer. Accordingly, the DC motors controlling each of these components are appropriately turned on and off by that onboard computer.

In recent years, there has been a growing interest in the analysis and control of mobile robots. Carriker, Khosla, and Krogh formulate the coordination of mobility and manipulation as a nonlinear optimization problem. A general cost function for point-to-point motion in Cartesian space is defined and is minimized using a simulated annealing method. Pin and Culioli define a weighted multi-criteria cost function which is then optimized using Newton's algorithm. Lin and Lewis describe a decentralized robust controller for a mobile robot by considering the base and the robot as two separate subsystems. Finally, Hootsmans and Dubowsky develop an extended Jacobian transpose control method to compensate for dynamic interactions between the manipulator and the base.

The present invention departs from the previous approaches by treating the base degrees-of-mobility equally with the arm degrees-of-manipulation. Configuration control formalism is then used to augment the basic task of end-effector motion by a set of user-defined additional tasks in order to exploit the redundancy introduced by the base mobility. The mobility and manipulation degrees-of-freedom both contribute to the execution of the basic and additional tasks. This approach is simple and computationally efficient and is therefore well-suited for on-line control of mobile robots.

STATEMENT OF THE INVENTION

The present invention provides an on-line method for coordinated arm and base motions by augmenting the hand motion with a set of user-specified additional tasks. The configuration control formalism is then used to determine the arm and base motions needed to accomplish the augmented task.

In the simple scheme presented here for coordinating mobility and manipulation in a mobile robot system, the degrees-of-mobility are added to the degrees-of-manipulation, and the overall degrees-of-freedom (DOF) are used to accomplish a set of user-defined tasks in addition to end-effector motion. This formulation puts the mobility DOF on the same footing as the manipulation DOF and treats them equally within a common framework.

The key advantages of this approach over the previous schemes are its flexibility, simplicity and computation efficiency. The ability to change the task specifications and the task weighting factor on-line based on the user requirements, provides a flexible framework for mobile robot control.

Furthermore, in contrast to previous approaches which are suitable for off-line motion planning, the simplicity of the present approach leads to computational efficiency which is essential for on-line control in real-time implementations. This approach is based on the inventor's prior work, but the resulting approach taken for coordinating mobility and manipulation in this solution is completely new.

The four case studies discussed in detail herein demonstrate the application of this coordinate control scheme to various mobile robots.

OBJECTS OF THE INVENTION

It is therefore a principal object of the present invention to provide a method for on-line control of mobile robots by treating the robot base's degrees-of-mobility equally with the arm' degrees-of-manipulation.

It is an additional object of the present invention to provide a method and apparatus for computationally efficient, on-line control of mobile robots wherein redundancy introduced by the mobile base is used to satisfy a set of user-defined additional tasks during end-effector motion.

It is still an additional object of the present invention to provide a method for coordinating mobility and manipulation in a mobile robot system wherein task specifications and task weighting may be changed on-line based on user requirements.

BRIEF DESCRIPTION OF THE DRAWINGS

The aforementioned objects and advantages of the present invention as well as additional objects and advantages thereof will be more fully understood as a result of a detailed description of preferred embodiments when taken in conjunction with the following drawings in which:

FIG. 2, comprising

FIG. 3, comprising

FIG. 7, comprising

FIG. 8, comprising

DETAILED DESCRIPTION OF PREFERRED EMBODIMENTS

Figure 1:
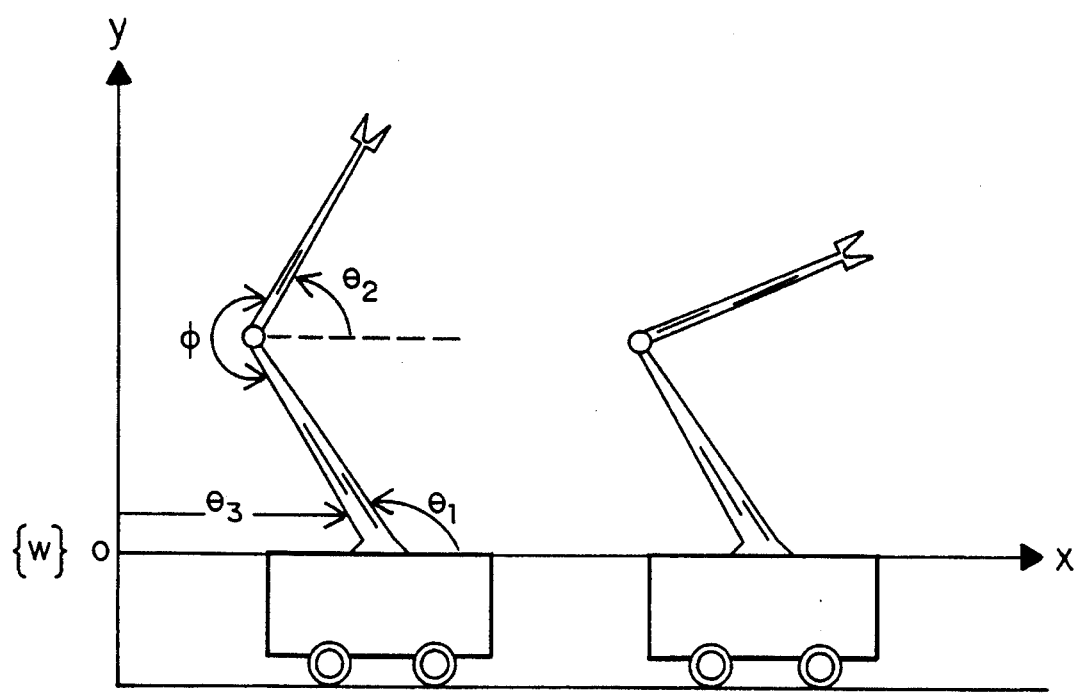
FIG. 1 illustrates a two-link robot arm mounted on a single axis movable cart to provide a prismatic joint and two revolute joints.
Figure 2A:
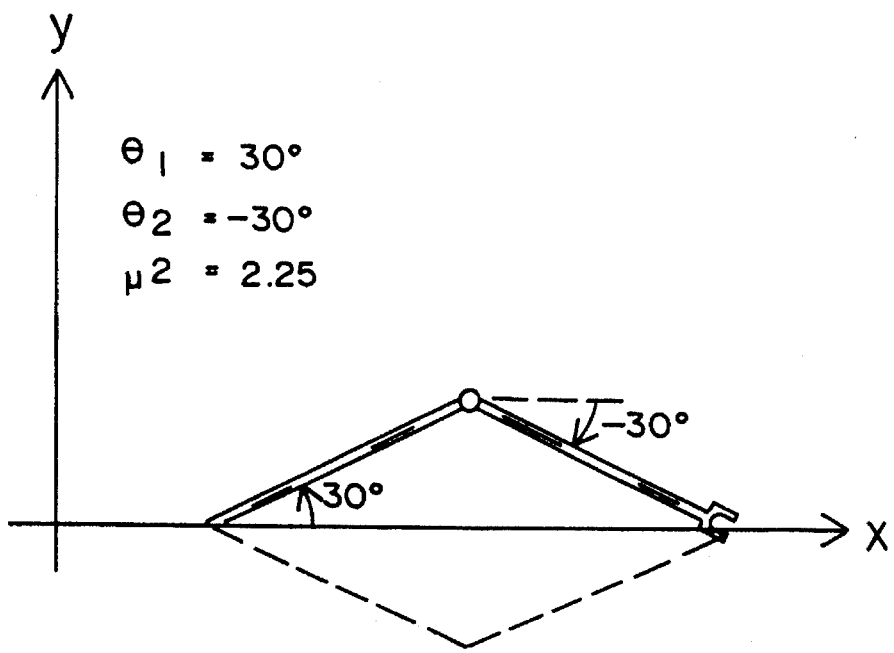
FIGS. 2(a) through 2(d), illustrates four possible arm configurations of the robot of FIG. 1 for a maximum manipulability configuration.
Figure 2B:
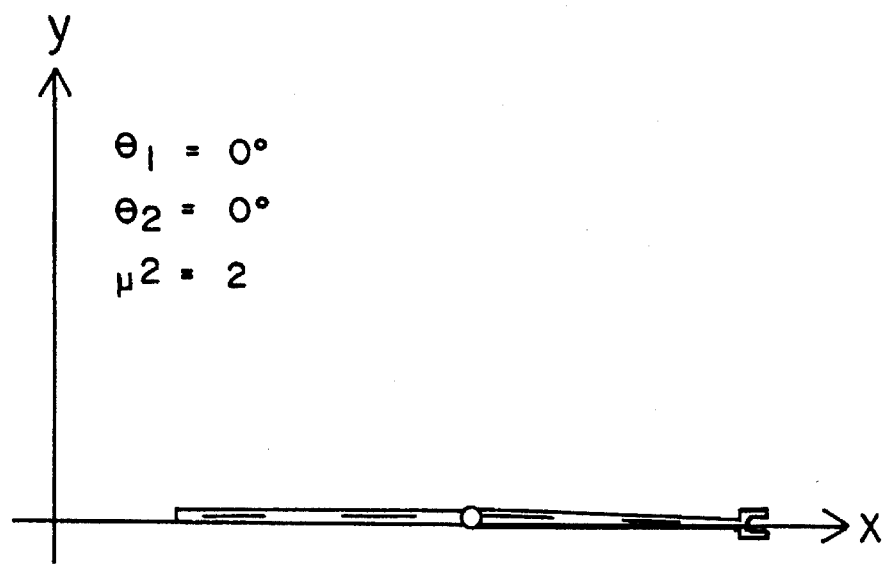
Figure 2C:
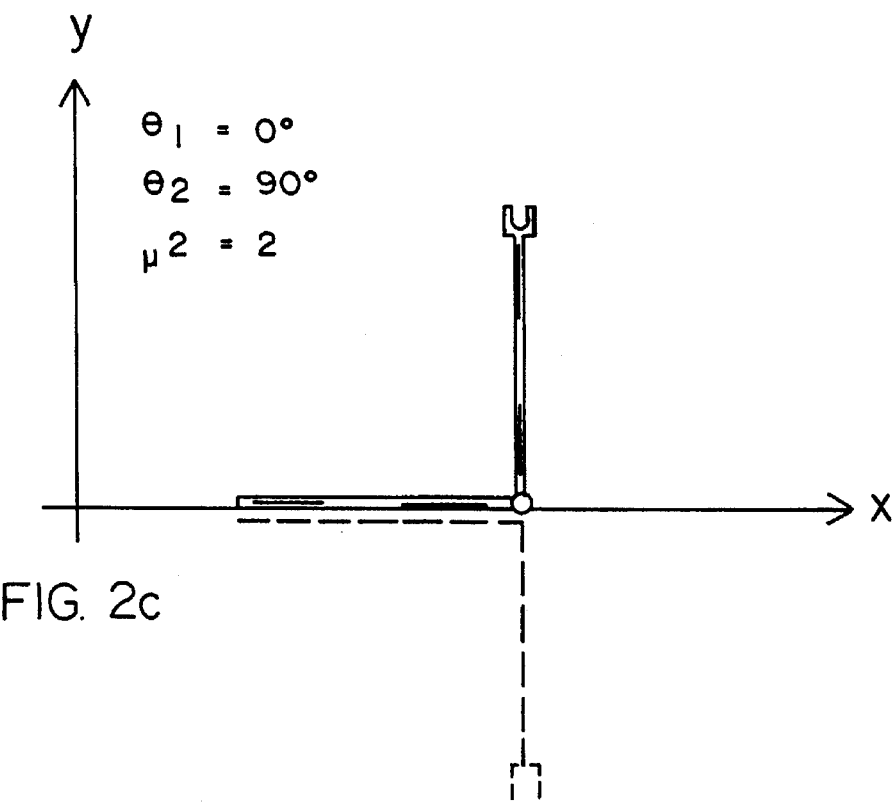
Figure 2D:
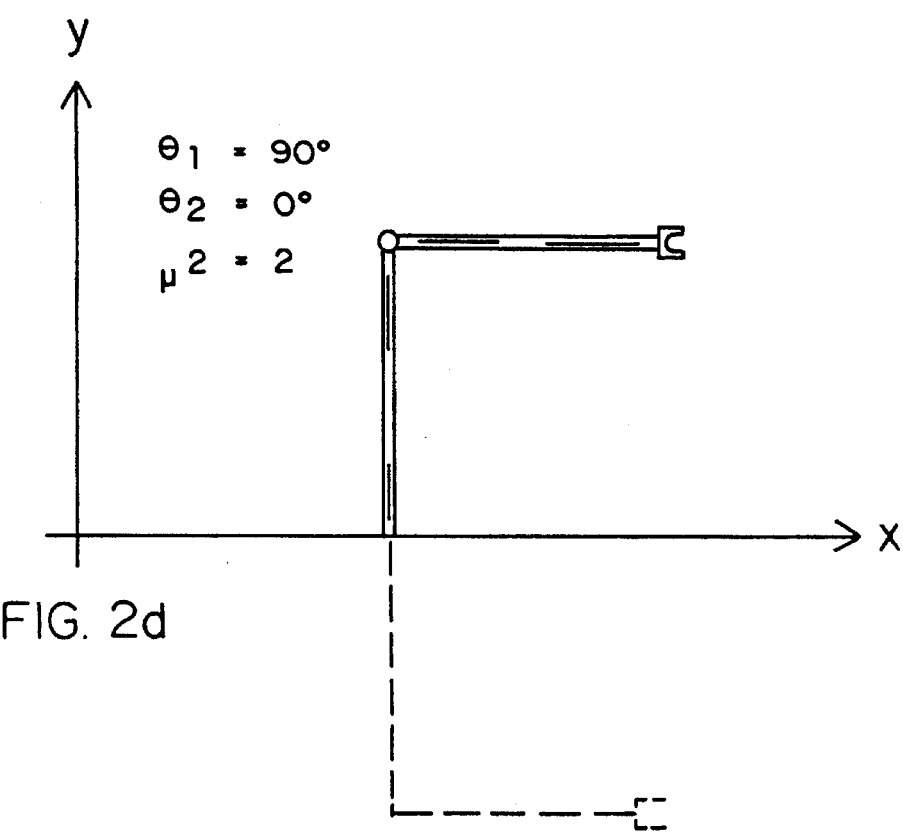
Figure 3A:
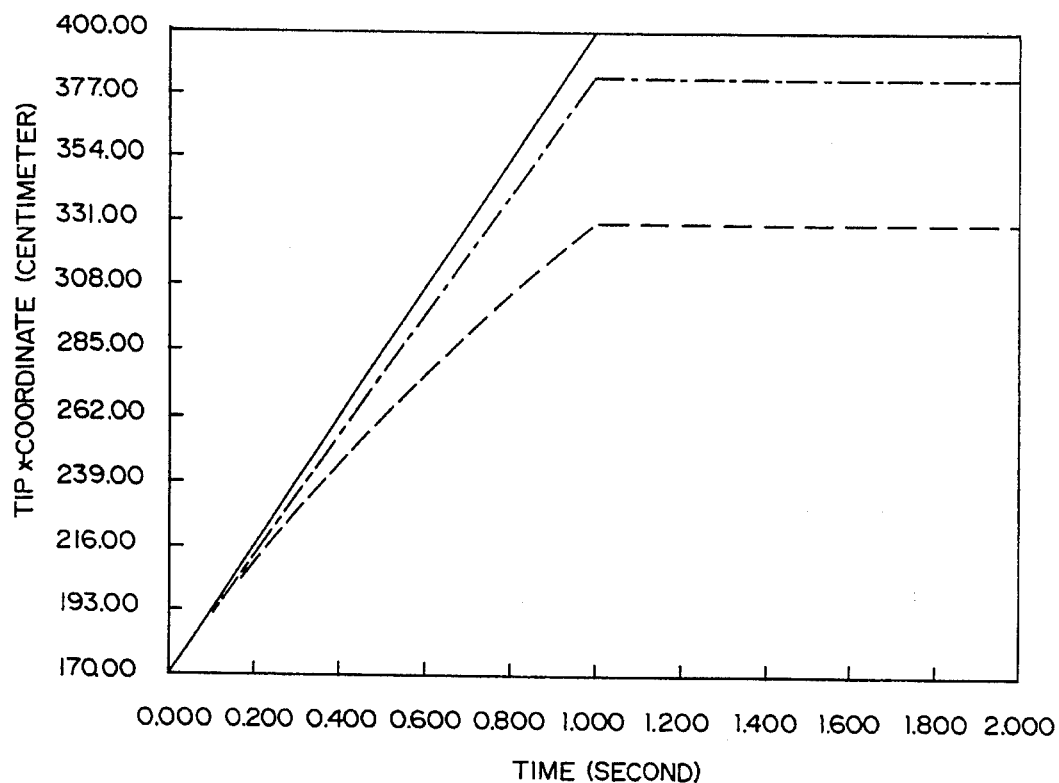
FIGS. 3(a) through 3(f), is a graphical illustration of a first computer simulation of the effects of three different velocity weighting factors on the robot of FIG. 1.
Figure 3B:
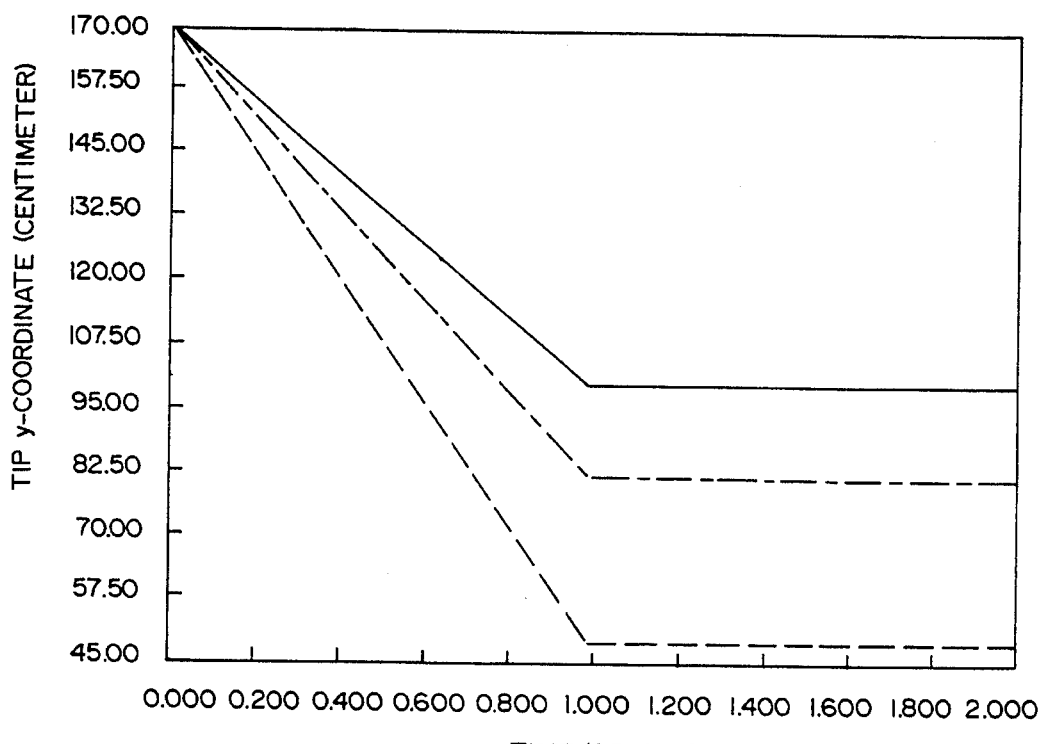
Figure 3C:
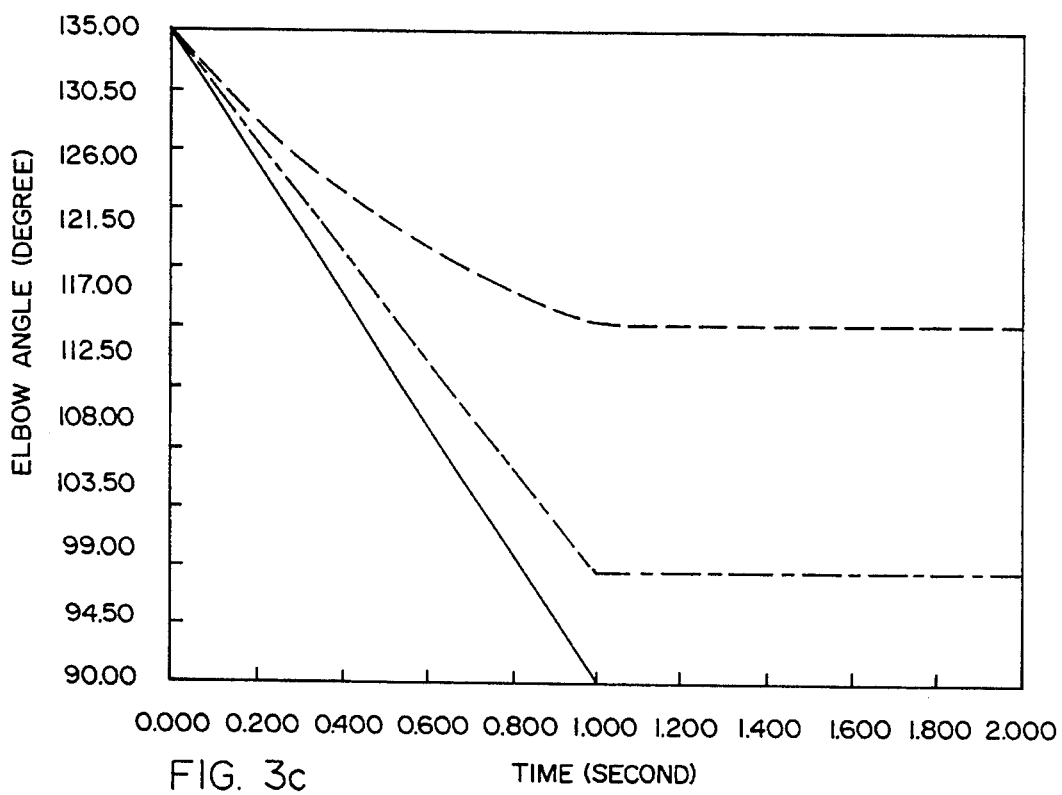
Figure 3D:
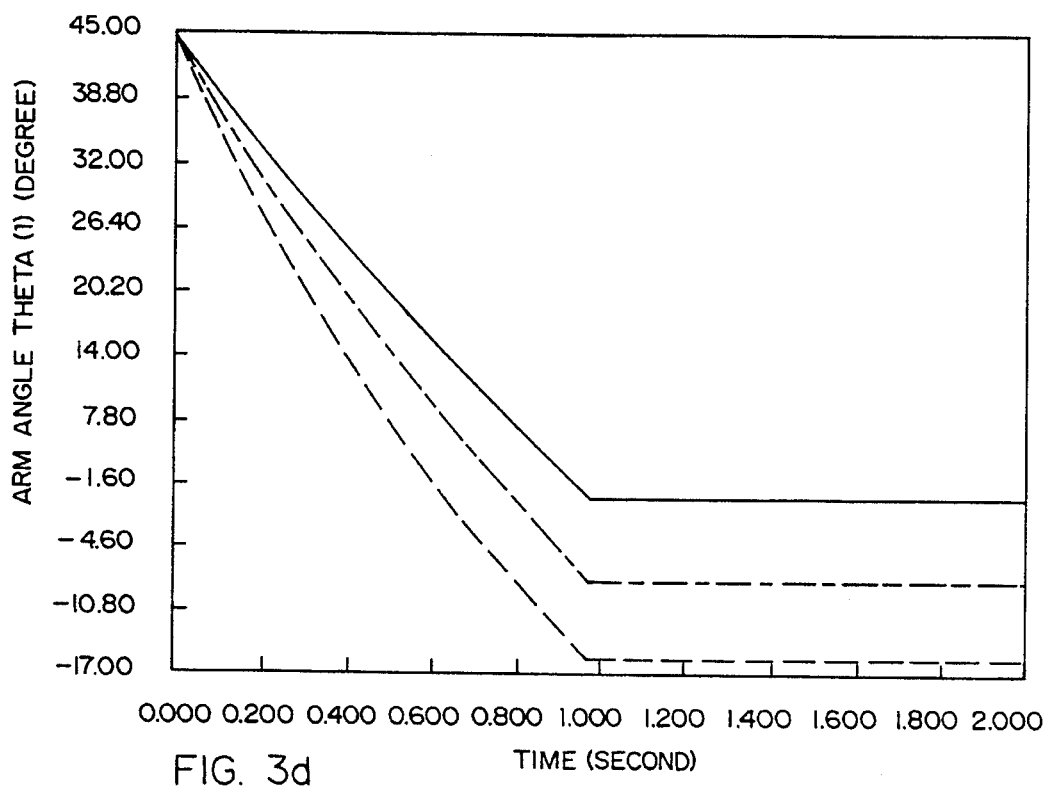
Figure 3E:
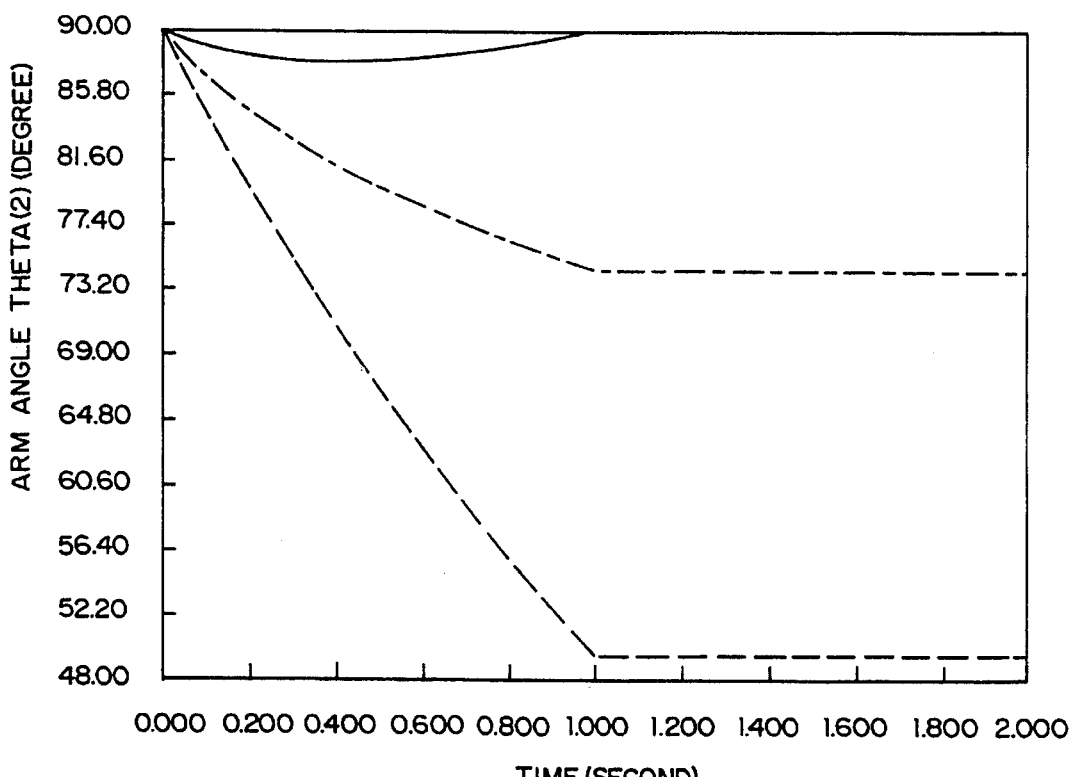
Figure 3F:
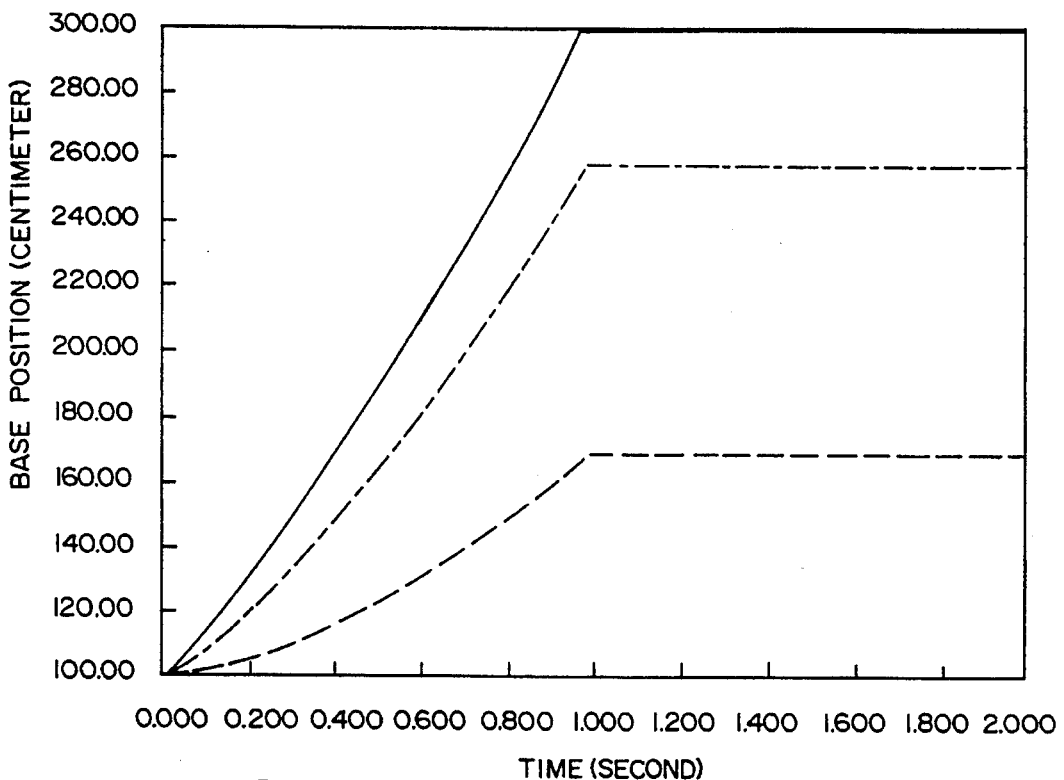
Figure 4A:
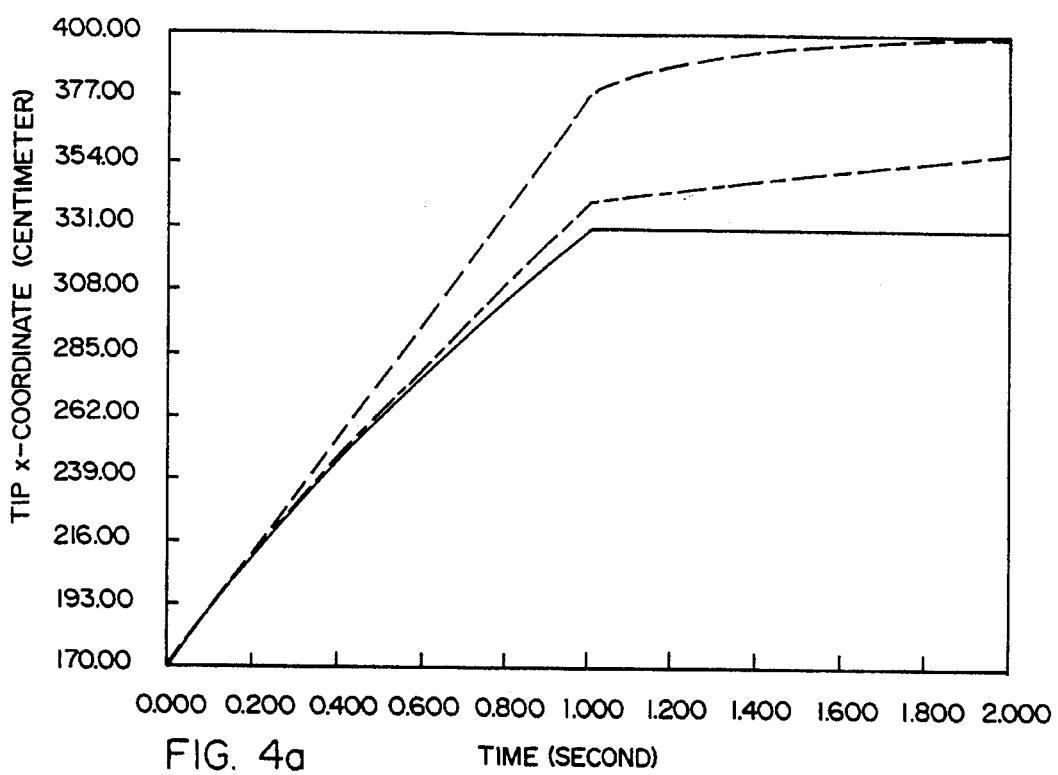
FIG. 4, comprising of FIGS. 4(a) through 4(f), is a graphical illustration of a second computer simulation of the effects of three different position feedback gains on the robot of FIG. 1.
Figure 4B:
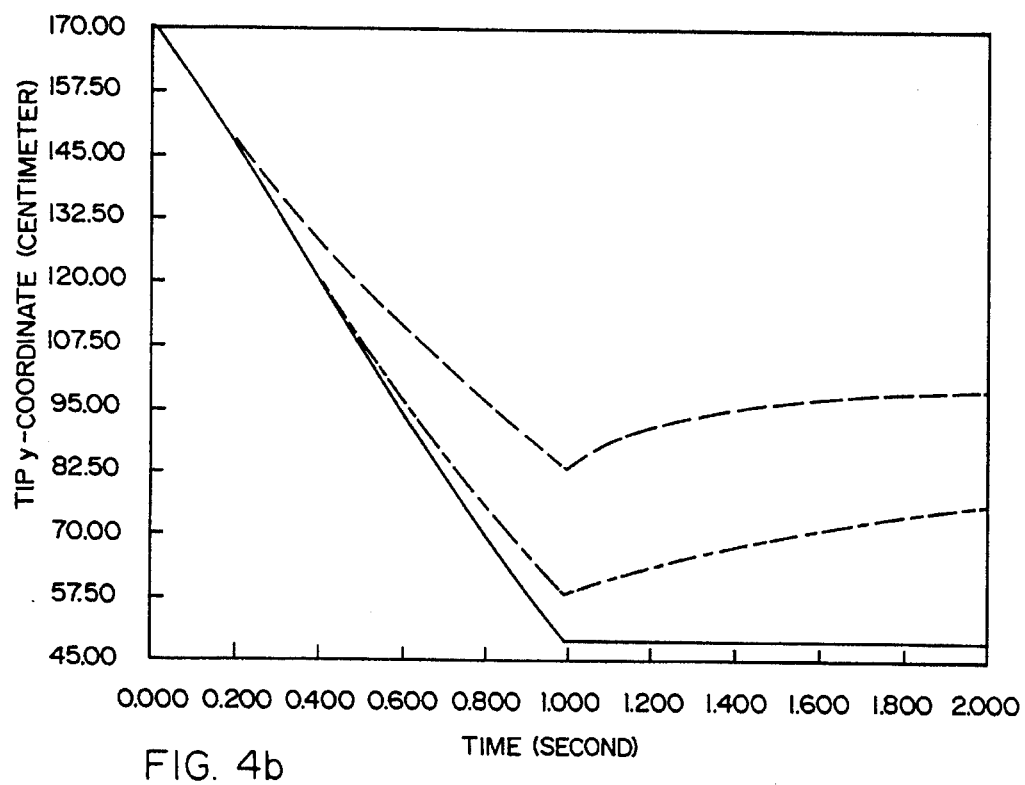
Figure 4C:
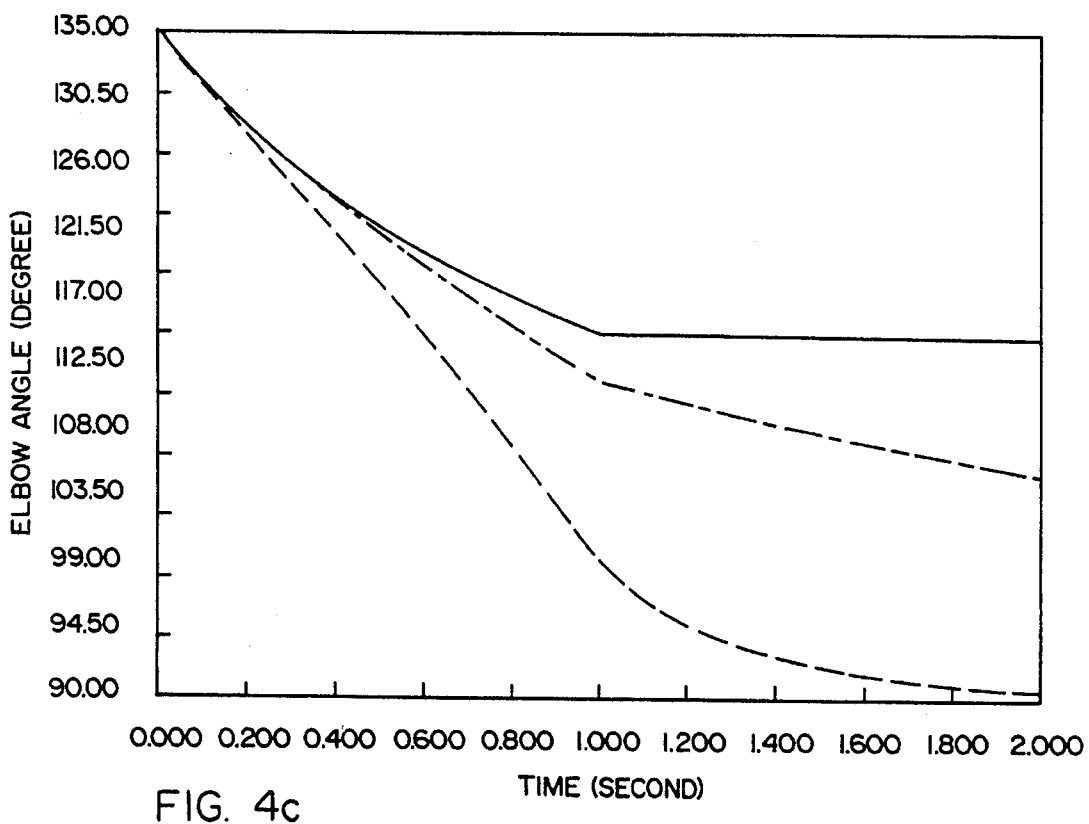
Figure 4D:
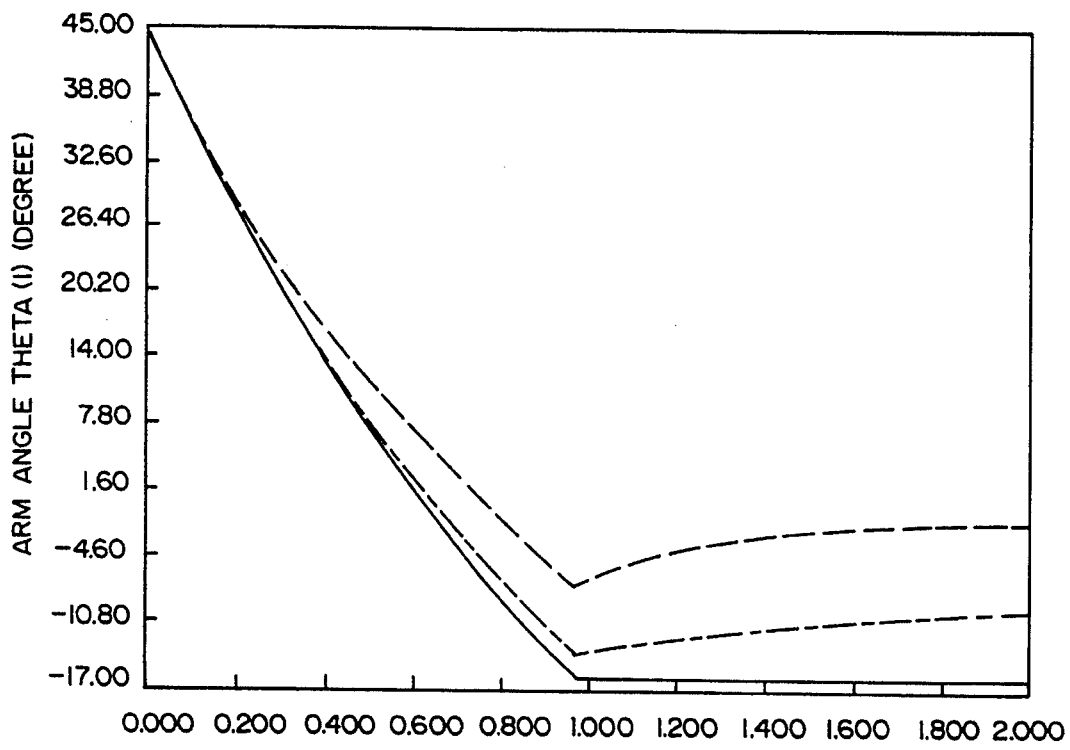
Figure 4E:
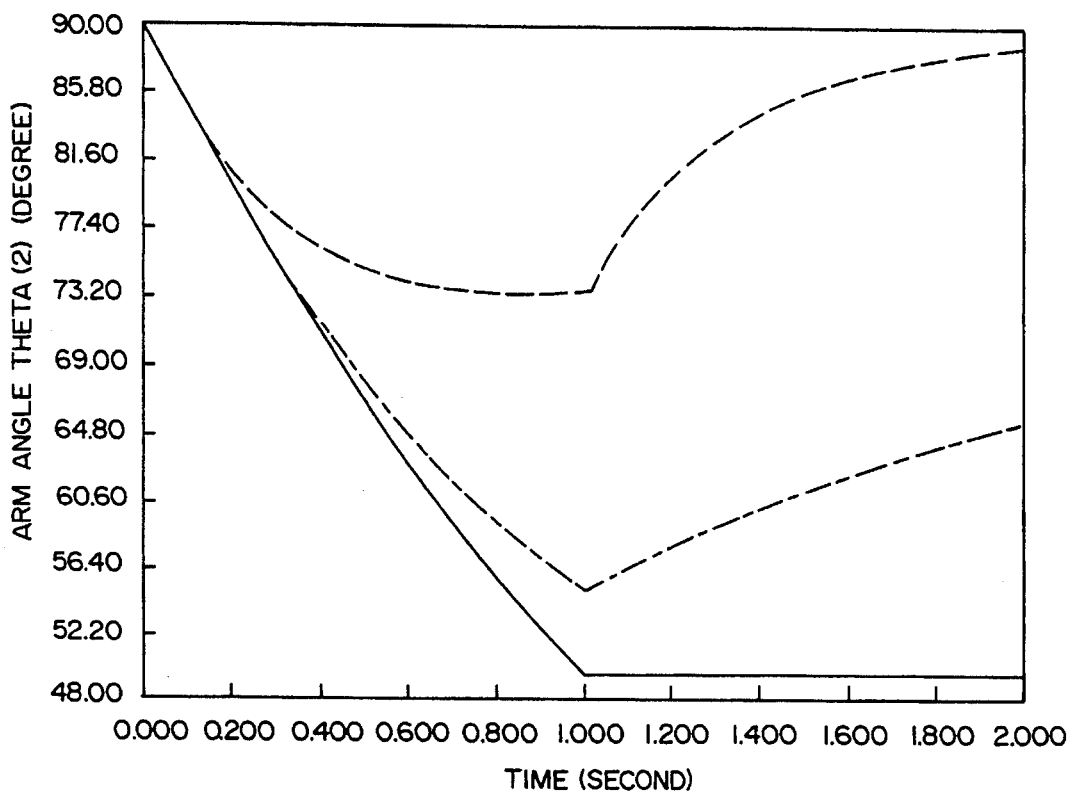
Figure 4F:
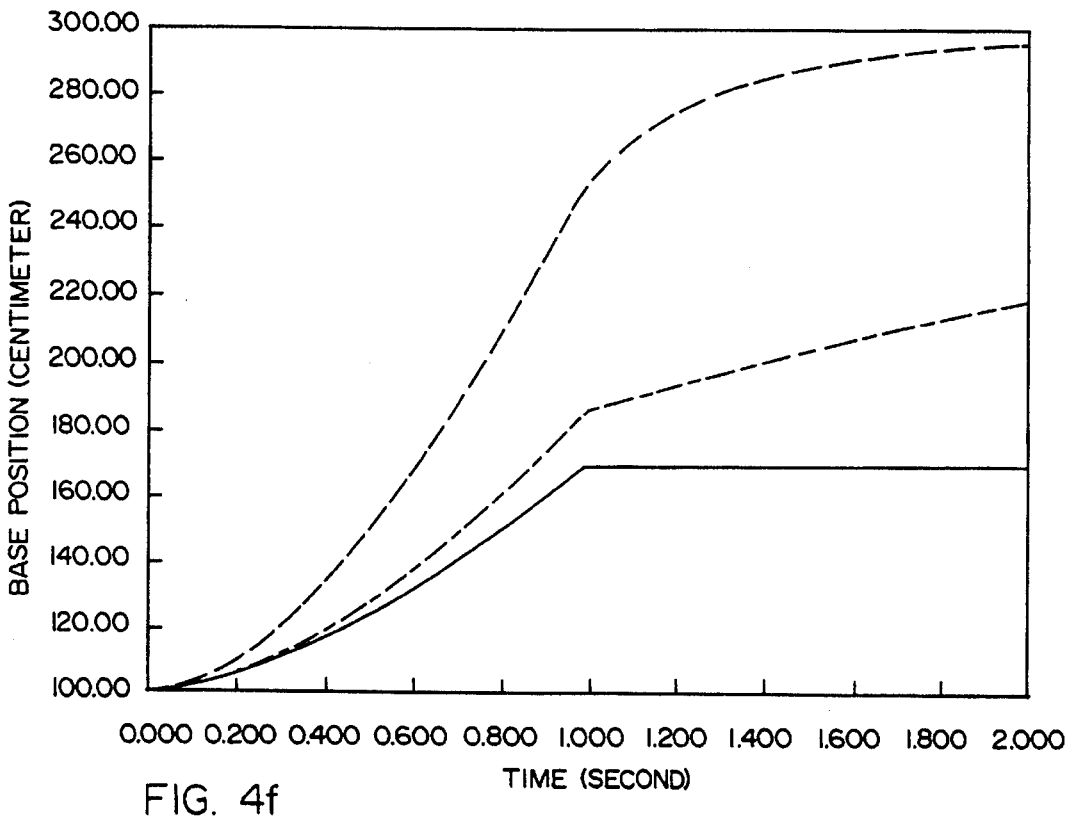

The system considered first herein consists of a robot manipulator mounted on a mobile base. Although the physical appearance of mobile robots are completely different, their underlying kinematic principles can be formulated in a similar manner. The overall manipulator arm-plus-mobile base system can be viewed as a composite of two subsystems: the robot arm with $n_a$ degrees-of-freedom, and the mobile base with $n_b$ degrees-of-freedom. The $n_a$ degrees-of-manipulation are often of the revolute joint type. The $n_b$ degrees-of-mobility can be treated as prismatic joints in tracked, gantry or wheeled robots or as revolute joints in compound robots. Let us define a fixed world frame of reference $\{W\}$ in the robot workspace, a moving base frame $\{B\}$ attached to the manipulator base, and a moving end-effector frame $\{E\}$ is related to the base frame $\{B\}$ by the 4×4 homogeneous transformation matrix $T_B^E(\theta_a)$, which is the product of the arm joint-to-joint transforms. The transformation that relates the base frame $\{B\}$ to the world frame $\{W\}$ is denoted by $T_W^B(\theta_a)$, and is obtained by multiplying the base interjoint transforms. Thus, the end-effector frame $\{E\}$ is related to the world frame $\{W\}$ by the 4×4 homogeneous transformation matrix $$T_W^E = T_W^B(\theta_b) \cdot T_B^E(\theta_a) = \begin{pmatrix} R & \vdots & p \\ \cdots & \cdots & \cdots \\ 0 \quad 0 \quad 0 & \vdots & 1 \end{pmatrix} \quad (1)$$

where $R=\{r_{ij}\}$ is the 3×3 end-effector rotation matrix and $p=[x, y, z]^T$ is the end-effector position vector, both with respect to the world fram $\{W\}$. One common three-parameter representation of the end-effector orientation is the equivalent angle-axis $\beta\hat{k}=[\hat{k}_x, \hat{k}_y, \hat{k}_z]^T$ which can be extracted readily from the rotation matrix R. Therefore, the $m(\leq 6)$ end-effector position and orientation coordinates to be controlled can be obtained from (Equation (1)) and represented by the mx1 vector $$Y = f(\theta_a, \theta_b) \quad (2)$$

Equation (2) describes the forward kinematic model that relates the arm and base joint coordinates $\{\theta_a, \theta_b\}$ to the end-effector Cartesian coordinates Y in the fixed world frame $\{W\}$. The differential kinematic model that relates to the end-effector Cartesian velocity $\dot{Y}$ to the arm and base joint velocities $\{\dot{\theta}_a, \dot{\theta}_b\}$ is given by $$\dot{Y} = [J_a(\theta) \vdots J_b(\theta)] \begin{bmatrix} \dot{\theta}_a \\ \cdots \\ \dot{\theta}_b \end{bmatrix} = J_e(\theta)\dot{\theta} \quad (3)$$

where $$J_a(\theta) = \frac{\partial f}{\partial \theta_a} \text{ and } J_b(\theta) = \frac{\partial f}{\partial \theta_b}$$

are the $mxn_a$ and $mxn_b$ Jacobian matrices of the arm and the base, respectively, $$\theta = \begin{bmatrix} \theta_a \\ \theta_b \end{bmatrix}$$

is the nx1 vector of mobility and manipulation joints, and $n=n_a+n_b$. This formulation puts the $n_b$ mobility and the $n_a$ manipulation degrees-of-freedom on the same footing, and treats both $\theta_a$ and $\theta_b$ equally within a common framework. Equations (2) and (3) describe the kinematics of a composite robotic system with n joint degrees-of-freedom operating in an m-dimensional Cartesian task space.

Before discussing coordinate control of mobility and manipulation, let us investigate the effect of base mobility on the end-effector manipulability index in the common case where the total joint degrees-of-freedom n exceeds the end-effector task dimension m. When the base is stationary, the end-effector manipulability index due to the arm joints $\{\theta_a\}$ is defined as Equation (11)

$$\mu_a(\theta) = \{\det[J_a(\theta) J_a^T(\theta)]\}^{1/2} \quad (4)$$

Note that in any nonsingular arm configuration, $J_a(\theta)J_a^T(\theta)$ is a symmetric positive-definite matrix whose determinant is a positive function of $\{\theta_a\}$. Now, when base mobility is introduced, the end-effector Jacobian matrix changes from $J_a$ to $J_e=[J_a:J_b]$, and the end-effector manipulability index due to both arm and base joints $\{\theta\}=\{\theta_a, \theta_b\}$ is obtained as $$\mu_e(\theta) = \{\det[J_e(\theta)J_e^T(\theta)]\}^{1/2} \quad (5)$$
$$= \{\det[J_a(\theta)J_a^T(\theta) + J_b(\theta)J_b^T(\theta)]\}^{1/2}$$

It can be shown that $$\mu_e(\theta) = \mu_a(\theta) + \sigma(\theta) \quad (6)$$

where $\sigma(\theta)$ is a positive function of $\theta$. Equation (6) implies that the base mobility always enhances the end-effector manipulability index. This is expected in view of the fact that the base degrees-of-freedom contribute to the end-effector motion and thereby increase the Cartesian mobility of the end-effector. At singular arm configurations, $J_a(\theta)$ is rank-deficient and $\mu_a(\theta)=0$. In this case $\mu_e(\theta)\geq\mu_a(\theta)$; that is the base mobility can in general increase the end-effector manipulability index, however in certain cases $\mu_e(\theta)$ is also equal to zero. We conclude that in general, the end-effector manipulability index is increased by the presence of base mobility.

Let us now consider the coordinated control of the composite arm-plus-base system. The composite system is kinematically redundant with the degree-of-redundancy $n-m$, since Equation (2) can produce infinite distinct joint motions $\{\theta_a(t), \theta_b(t)\}$ which yield the same end-effector trajector $Y(t)$. We adopt the configuration control approach in which an appropriate joint motion is chosen from this infinite set which causes the composite robotic system to accomplish an additional user-specified task. This additional task is performed by direct control of a set of $r(=n-m)$ user-defined kinematic functions $\phi=g(\theta)$ while controlling the end-effector motion, where $\phi$ and $g$ are rx1 vectors. This is achieved by augmenting the m end-effector coordinates Y in Equation (2) by the r kinematic functions $\phi$ to yield the nx1 configuration vector X as $$X = \begin{pmatrix} Y \\ \Phi \end{pmatrix} = \begin{pmatrix} f(\theta) \\ g(\theta) \end{pmatrix} = h(\theta) \quad (7)$$

Equation (7) represents the augmented forward kinematics of the composite robotic system. This approach to redundancy resolution is very general since each kinematic function $\{\phi_i(t)\}$ can represent a geometric variable (e.g., coordinate of a point on the robot), a physical variable (such as a joint gravity torque), or an abstract mathematical function (e.g., projection of the gradient of an objective function). Furthermore, the user is not confined to a fixed set of kinematic functions and can select different $\{\phi_i(t)\}$ depending on the task requirements during the execution of the end-effector motion. Once the kinematic functions $\{\phi_i(\theta)\}$ are selected, the user defines the desired time variations of these functions $\{\phi_{di}(t)\}$. Therefore, the redundancy is utilized so that the manipulator satisfies a set of r kinematic constraints $$\phi_i(\theta) = \phi_{di}(t) \quad i=1,\ldots,r \quad (8)$$

while executing the desired end-effector motion. In other words, let the n×1 desired configuration vector be denoted by $$X_d(t) = \begin{pmatrix} Y_d(t) \\ \Phi_d(t) \end{pmatrix} \quad (9)$$

where $Y_d(t)$ defines the prescribed end-effector motion (basic task) and $\phi_d(t)$ represents the desired evolution of the kinematic functions (additional task). The configuration control approach is to find the required joint motions such that the configuration vector $X(\theta)$ tracks the desired trajector $X_d(t)$. This formulation puts the redundancy resolution constraint on the same footing as the end-effector task, and treats both Y and $\phi$ equally in a common format. The configuration control problem can be solved either by a dynamic controller which generates the required joint torques $\Gamma(t)$, or alternatively by a kinematic controller that produces the appropriate joint commands $\theta_d(t)$. We adopt the kinematic control implementation, and furthermore to address the general case where there are no close-form analytical inverse kinematic solutions, the differential kinematics approach is used. In the general case where $r(\geq n-m)$ additional tasks are specified, the augmented differential kinematic model of the manipulator arm-plus-mobile base system is obtained as $$\dot{X}(t) = \begin{pmatrix} \dot{Y}(t) \\ \dot{\Phi}(t) \end{pmatrix} = \begin{pmatrix} J_a(\theta) & \vdots & J_b(\theta) \\ \cdots & \cdots & \cdots \\ & J_c(\theta) & \end{pmatrix} \begin{pmatrix} \dot{\theta}_a \\ \cdots \\ \dot{\theta}_b \end{pmatrix} = J(\theta)\dot{\theta} \quad (10)$$

where $$J_c(\theta) = \frac{\partial \Phi}{\partial \theta}$$

is the r×n Jacobian matrix associated with the kinematic functions $\phi$, and $J(\theta)$ is the (m+r)×n augmented Jacobian matrix. To find the base mobility and arm motion that meet the end-effector specification $Y(\theta)=Y_d(t)$ and the kinematic constraints $\phi(\theta)=\phi_d(t)$, we need to solve the augmented differential kinematic equation $$\dot{X}_d(t) = J(\theta)\dot{\theta}(t) \quad (11)$$

To avoid large joint velocities, the user can impose the velocity weighting factor $W_v=$ $$\begin{pmatrix} W_a & \vdots & 0 \\ \cdots & \cdots & \cdots \\ 0 & \vdots & W_b \end{pmatrix} \text{ on } \begin{pmatrix} \dot{\theta}_a \\ \cdots \\ \dot{\theta}_b \end{pmatrix},$$

and attempt to minimize the weighted sum-of-squares of joint velocities $$\|\dot{\theta}_a\|^2_{W_a} + \|\dot{\theta}_b\|^2_{W_b}.$$

Typically, the base movement is much slower than the arm motion and $W_b$ is much larger than $W_a$. In addition, the user can assign priorities to the different basic and additional task requirements by selecting the appropriate task weighting factor $$\begin{pmatrix} W_e & \vdots & 0 \\ \cdots & \cdots & \cdots \\ 0 & \vdots & W_c \end{pmatrix},$$

and seek to minimize the weighted sum of task velocity errors $$\|\dot{E}_e\|^2_{W_e} + \|\dot{E}_c\|^2_{W_c},$$

where $\dot{E}_e = \dot{Y}_d - J_e\dot{\theta}$ and $\dot{E}_c = \dot{\phi}_d - J_c\dot{\theta}$ are the end-effector and constraint velocity errors. Hence, we seek to find the optimal solution of Equation (11) that minimizes the scalar cost function $$L = \|\dot{\theta}_a\|^2_{W_a} + \|\dot{\theta}_b\|^2_{W_b} + \|\dot{Y}_d - J_e\dot{\theta}\|^2_{W_e} + \|\dot{\Phi}_d - J_c\dot{\theta}\|^2_{W_c} \quad (12)$$

$$= \dot{\theta}_a^T W_a \dot{\theta}_a + \dot{\theta}_b^T W_b \dot{\theta}_b + \dot{E}_e^T W_e \dot{E}_e + \dot{E}_c^T W_c \dot{E}_c$$

The optimal damped-least-squares solution of Equation (11) that minimizes Equation (12) is $$\dot{\theta} = [J^T W_t J + W_v]^{-1} J^T W_t \dot{X}_d \quad (13)$$

Note that in the special case where r=n−m and $W_v=0$, Equation (13) gives $$\dot{\theta} = J^{-1} \dot{X}_d \quad (14)$$

assuming det[J]≠0, which is the classical inverse Jacobian solution. To correct for task-space trajectory drift which occurs inevitably due to the linearization error inherent in differential kinematic schemes, we introduce the actual configuration vector X in Equation (13).

$$\dot{\theta} = [J^T W_t J + W_v]^{-1} J^T W_t [\dot{X}_d + K(X_d - X)] \quad (15)$$

where K is an (m+r)×(m+r) constant diagonal matrix with positive diagonal elements. The introduction of the error correction term $K(X_d-X)$ in Equation (15) provides a "closed-loop" characteristic whereby the difference between the desired and actual configuration vectors is used as a driving term in the inverse kinematic transformation. Note that for task-space trajectories with constant final values, $\dot{X}_d(t)=0$ for $t \geq T \geq \tau$ where $\tau$ is the motion duration, and using Equation (13) we obtain $\dot{\theta}(t)=0$ for $t \geq \tau$; i.e., the arm and base joints will cease motion for $t \geq \tau$ and any task tracking-error at $t=\tau$ will continue to exist for $t>\tau$. However, by using Equation (15) the arm and base joints continue to move for $t \geq \tau$ until the desired configuration vector is reached, i.e., $X \to X_d$ as $t \to \infty$. The value of K determines the rate of convergence of X to $X_d$.

For digital control implementation, Equation (15) is discretized as $$\frac{\theta(N+1) - \theta(N)}{\Delta t} = \quad (16)$$

$$[J^T W_t J + W_v]^{-1} J^T W_t \left[ \frac{X_d(N+1) - X_d(N)}{\Delta t} + KX_d(N) - KX(N) \right]$$

or $$\theta(N+1) = \theta(N) + [J^T W_t J + W_v]^{-1} J^T W_t [X_d(N+1) - (1-K\Delta t)X_d(N) - K\Delta t X(N)] \quad (17)$$

where N denotes the sampling instant and $\Delta t$ is the sampling period. Equation (17) is used to compute $\theta(N+1)$ given $\{\theta(N), X_d(N+1), X_d(N), X(N)\}$. Note that in the special case when $$K = \frac{1}{\Delta t} = f,$$

where f is the sampling frequency, Equation (17) simplifies to $$\theta(N+1) = \theta(N) + [J^T W_t J + W_v]^{-1} J^T W_t [X_d(N+1) - X(N)] \quad (18)$$

This equation can be considered as the discrete-time version of Equation (13) with the desired position $X_d(N)$ replaced by the actual position $X(N)$ to correct for drift. Notice that, in practice, the inversion of the positive-definite matrix $[J^T W_t J + W_v]$ is not needed, and $\theta(N+1)$ can be found using the Cholesky decomposition.

The proposed damped-least-squares configuration control scheme provides a general and unified framework for coordinated control of mobility and manipulation, allows independent weighting of base movement and arm motion, and enables a wide range of redundancy resolution goals to be accomplished. Note that multiple goals can be defined for redundancy resolution and weighted appropriately based on the current task requirements.

In summary, the procedure for coordinated control of base mobility and arm manipulation is as follows:

1. Augment by column the arm Jacobian $J_a$ with the base Jacobian $J_b$ to obtain the overall end-effector Jacobian $J_e = [J_a : J_b]$. Note that the availability of base mobility appears as extra columns in the Jacobian matrix, since in effect it increases the dimension of the joint space.

2. Augment by row the end-effector Jacobian $J_e$ with the constraint Jacobian $J_c$ which relates to the user-defined additional task to be accomplished due to kinematic redundancy.

This yields the augmented Jacobian $$J = \begin{bmatrix} J_e \\ \cdots \\ J_c \end{bmatrix}.$$

Note that the additional task leads to extra rows in the Jacobian matrix, since it effectively increases the dimension of the task space.

3. Specify the end-effector and constraint task weighting factors $W_t = \text{diag}\{W_e, W_c\}$ and the arm and base joint velocity weighting factors $W_v = \text{diag}\{W_a, W_b\}$.

4. Use the closed-loop damped-least-squares approach to find the optimal arm and base motions as $\dot{\theta} = [J^T W_t J + W_v]^{-1} J^T W_t [\dot{X}_d + K(X_d - X)]$.

CASE STUDIES

We present four case studies demonstrating coordinated control of mobility and manipulation. The cases are chosen to represent common examples of mobile robots with both revolute (R) and prismatic (P) joints. Case studies 1, 3, and 4 are concerned with tracked robots where base mobility is provided as a prismatic joint. In case study 2, a vehicle with 3 DOF is used to produce base motion. For each example, a complete analysis of the arm-plus-base singularities is given. Each example illustrates a particular aspect of coordinating mobility and manipulation.

Case Study 1: Planar 2R-1P Mobile Robot

Consider a two-link robot arm mounted on a cart, as shown in FIG. 1. The cart motion along the x-axis is treated as a prismatic joint $\theta_3$ and the arm joints $\theta_1$ and $\theta_2$ are considered as revolute joints of the overall 3 DOF robot. The forward kinematic model that relates the tip position $Y=(x, y)^T$ in the fixed world frame to the joint displacements $\theta=(\theta_1, \theta_2, \theta_3)^T$ is given by $$x = \cos\theta_1 + \cos\theta_2 + \alpha\theta_3 \quad y = \sin\theta_1 + \sin\theta_2 \quad (19)$$

where the joint displacement $\theta_1$ and $\theta_2$ are the absolute angles measured relative to the positive x-axis, and the link lengths are assumed to be unity. The scalar parameter $\alpha$ is introduced in Equation (19) to allow comparison of the stationary-base case ($\alpha=0$) with the mobile-base case ($\alpha=1$). The differential kinematic model that relates the joint velocities $\dot{\theta}=(\dot{\theta}_1, \dot{\theta}_2, \dot{\theta}_3)^T$ to the resulting tip velocities $\dot{Y}=(\dot{x}, \dot{y})^T$ is given by $$\dot{Y} = \begin{pmatrix} -\sin\theta_1 & -\sin\theta_2 & \alpha \\ \cos\theta_1 & \cos\theta_2 & 0 \end{pmatrix} \dot{\theta} = J_e(\theta)\dot{\theta} \quad (20)$$

where $J_e(\theta)$ is the 2×3 tip Jacobian matrix. At any joint configuration $\theta$, the tip manipulability index $\mu(\theta)$, which represents the ability to change the tip x and y coordinates, is defined to be $$\mu(\theta) = \{\det[J_e(\theta)J_e^T(\theta)]\}^{1/2} \quad (21)$$
$$= \{\sin^2(\theta_2 - \theta_1) + \alpha^2[\cos^2\theta_1 + \cos^2\theta_2]\}^{1/2}$$

From Equation (21), it is seen that $\mu(\theta)$ contains two components. The first component $\sin^2(\theta_2-\theta_1)$ is the classical manipulability index for a stationary-base two-jointed arm. The second component $\alpha^2[\cos^2\theta_1 + \cos^2\theta_2]$ is due to the presence of base mobility. Note that the base mobility always increases the manipulability index, as discussed above. Equation (21) indicates that $\mu(\theta)$ is positive for all $\theta$, i.e., the rows of $J_e$ are always independent and the robot does not have any tip singularities, except when $\theta_1=\theta_2=90$ degrees, which corresponds to the arm in the vertical configuration (parallel to the y-axis) which puts the tip on the workspace boundary. In this case, the second row of $J_e$ vanishes and the joint velocities $(\dot{\theta}_1, \dot{\theta}_2, \dot{\theta}_3)$ do not contribute to the y-velocity ($\dot{y}$). Note that his result stands in contrast to the classical tip singularities for a stationary-base two-jointed arm ($\alpha=0$ case) which occur when $\theta_2=\theta_1$ or $\theta_2=180$ degrees $+\theta_1$; i.e., when the arm is fully stretched or fully folded. The reason for lack of tip singularities for the mobile-base two-jointed arm in these configurations is that the base mobility $\theta_3$ allows complete control of the tip x-coordinate, while the tip y-coordinate can be controlled by either of the arm joints $\theta_1$ or $\theta_2$. We conclude that the base mobility has considerably reduced the singular configurations of the arm.

Consider the tip manipulability index $\mu(\theta)$ given by Equation (21). In the case of stationary base ($\alpha=0$), the manipulability index $\mu(\theta)=|\sin(\theta_2-\theta_1)|$ attains its maximum value of unity when $\theta_2-\theta_1=90$ degrees, i.e., when the upper-arm and forearm are perpendicular, which is a classical result obtained originally by Yoshikawa. However, in the case of mobile base ($\alpha=1$), the robot configuration with maximum manipulability index is obtained by solving $$\frac{\partial \mu^2(\theta)}{\partial \theta_1} = -2\sin(\theta_2 - \theta_1)\cos(\theta_2 - \theta_1) - 2\cos\theta_1\sin\theta_1 = 0 \quad (22)$$

$$\frac{\partial \mu^2(\theta)}{\partial \theta_2} = 2\sin(\theta_2 - \theta_1)\cos(\theta_2 - \theta_1) - 2\cos\theta_2\sin\theta_2 = 0$$

FIGS. 2(a)–2(d) show the four possible arm configuration that satisfy the optimality condition Equation (22), together with their associated cost function $\mu^2$. It is seen that the arm configuration having the maximum $\mu(\theta)$ is given by $\theta_1=\pm 30$ degrees, $\theta_2=\pm 30$ degrees, yielding $\mu^2=2.25$. In fact, the classical configuration $\theta_2-\theta_1=90$ degrees is no longer an optimal solution with $\mu^2=2$.

Let us now consider the coordinated control of the cart mobility and arm manipulation. The robotic system shown in FIG. 1 is kinematically redundant since it has a three-dimensional joint space (n=3) and only a two-dimensional task space (m=2). The single degree-of-redundancy (n−m=1) can be used to perform any user-defined task, in addition to the basic task of tip placement. In this section, we define the additional task as optimization of the manipulability index. However, since a truly optimal configuration will fix both revolute joints $\theta_1$ and $\theta_2$, we propose to use the classical suboptimal configuration $\theta_2-\theta_1=90$ degrees, which imposes only one constrain on $\theta_1$ and $\theta_2$. This reasonable since the degradation of $\mu^2$ due to this suboptimal configuration is only 12.5% relative to the truly optimal configuration. Hence, the additional task is defined as $$\phi(\theta)=180°-(\theta_2-\theta_1)=\phi_d(t) \tag{23}$$

where the elbow angle $\phi$ is the relative angle between links 1 and 2, and $\phi_d(t)$ is the desired elbow angle trajectory. We can now augment the basic task of tip motion by the additional task Equation (23) to obtain the augmented task $$x(\theta)=\cos\theta_1+\cos\theta_2+\theta_3=x_d(t)\ y(\theta)=\sin\theta_1+\sin\theta_2=y_d(t)\ \phi(\theta)=180°-(\theta_2-\theta_1)=\phi_d(t) \tag{24}$$

where $x_d(t)$ and $y_d(t)$ are the desired tip motion trajectories. The augmented task is therefore accomplished by solving the differential kinematic equation $$\dot{X}_d = \begin{pmatrix} \dot{x}_d \\ \dot{y}_d \\ \dot{\phi}_d \end{pmatrix} = \begin{pmatrix} -\sin\theta_1 & -\sin\theta_2 & 1 \\ \cos\theta_1 & \cos\theta_2 & 0 \\ 1 & -1 & 0 \end{pmatrix} \begin{pmatrix} \dot\theta_1 \\ \dot\theta_2 \\ \dot\theta_3 \end{pmatrix} = \begin{pmatrix} J_e \\ \cdots \\ J_c \end{pmatrix} \dot\theta \tag{25}$$

Let us now examine the singularities of the 3×3 augmented Jacobian matrix $$J = \begin{pmatrix} J_e \\ \cdots \\ J_c \end{pmatrix}$$

as $$det[J(\theta)] = \begin{vmatrix} -\sin\theta_1 & -\sin\theta_2 & 1 \\ \cos\theta_1 & \cos\theta_2 & 0 \\ 1 & -1 & 0 \end{vmatrix} = -(\cos\theta_1 + \cos\theta_2) \tag{26}$$

Thus, the singular configurations of J are found to be $\theta_2=180$ degrees $\pm\theta_1$. In these singular configurations, the tip y-coordinate and the elbow angle $\phi$ cannot be controlled independently.

Now, the base motion is often considerably slower than the joint movements, and it is therefore desirable to accomplish the augmented task with as small a base velocity $\dot\theta_3$ as possible. The optimal joint motion which minimizes $$L=\|\dot{X}_d-J\dot\theta\|^2+\gamma\dot\theta_3^2 \tag{27}$$

where $\gamma$ is $\dot\theta_3$ weighting factor, is given by the closed-loop damped-least-squares solution of Equation (27) as $$\dot\theta = \left[ J^T J + \begin{pmatrix} 0 & 0 & 0 \\ 0 & 0 & 0 \\ 0 & 0 & \gamma \end{pmatrix} \right]^{-1} J^T \begin{bmatrix} \dot{x}_d + k(x_d - x) \\ \dot{y}_d + k(y_d - y) \\ \dot\phi_d + k(\phi_d - \phi) \end{bmatrix} \tag{28}$$

where k is a positive scalar. Let us assume that initially, the base is at $\theta_3=1.0$ meter and the arm joint angles are $\theta_1=45$ degrees, $\theta_2=90$ degrees; yielding the initial tip position $x_i=y_i=1.707$ meter and the initial elbow angle $\phi_i=135$ degrees. Suppose that we define the final configuration as $x_f=4.0$ meter, $y_f=1.0$ meter, $\phi_f=90$ degrees. Notice that $\phi_f=90$ degrees ensures maximum manipulability for the end-effector in the final configuration when the cart is stationary. The desired motion trajectories are specified as $$x_d(t) = \begin{cases} x_i + \dfrac{x_f - x_i}{\tau} \cdot t & , \text{for } t \leq \tau \\ x_f & , \text{for } t > \tau \end{cases} \tag{29}$$

$$y_d(t) = \begin{cases} y_i + \dfrac{y_f - y_i}{\tau} \cdot t & , \text{for } t \leq \tau \\ y_f & , \text{for } t > \tau \end{cases}$$

$$\phi_d(t) = \begin{cases} \phi_i + \dfrac{\phi_f - \phi_i}{\tau} \cdot t & , \text{for } t \leq \tau \\ \phi_f & , \text{for } t > \tau \end{cases}$$

where $\tau$ is the duration of motion. Note that these trajectories produce a straight-line motion in task-space from $(x_i, y_i)$ to $(x_f, y_f)$, since $$\frac{x - x_i}{x_f - x_i} = \frac{y - y_i}{y_f - y_i}.$$

Now, the desired task space velocities are $$\dot{x}_d(t) = \begin{cases} \dfrac{x_f - x_i}{\tau} & , t \leq \tau \\ 0 & , t > \tau \end{cases} \tag{30}$$

$$\dot{y}_d(t) = \begin{cases} \dfrac{y_f - y_i}{\tau} & , t \leq \tau \\ 0 & , t > \tau \end{cases}$$

$$\dot\phi_d(t) = \begin{cases} \dfrac{\phi_f - \phi_i}{\tau} & , t \leq \tau \\ 0 & , t > \tau \end{cases}$$

To find the required joint motions, we substitute the task velocities $(\dot{x}_d, \dot{y}_d, \dot\theta_d)$ from Equation (30) into Equation (28) and solve Equation (28) to obtain the joint velocities $(\dot\theta_1, \dot\theta_2, \dot\theta_3)$. The acquired solution is then integrated numerically in discrete time to obtain the joint positions as $\theta(N+1)= \theta(N)+\dot\theta\Delta t$, where N is the sampling instant and $\Delta t$ is the sampling period. The Jacobian matrix in Equation (28) is then recomputed using the new $\theta$ and Equation (28) is solved and this procedure is repeated.

Two computer simulation studies performed to demonstrate the effects of the cart velocity weighting factor $\gamma$ and the position feedback gain k on the system performance. In both studies, we take $\tau=1$ sec, $\Delta t=0.01$ sec, the units of (x, y, $\phi$) are meters and radian, and Equation (28) is solved recursively for two seconds (i.e., 200 times).

Case 1—Effect of $\gamma$. In this case, we set k=0 and solve Equation (28) under three different conditions $\gamma=0, 0.1, 1$. The computer simulation results are presented in FIGS. 3a–3f (the units are changed to centimeters and degrees for presentation), and the steady-state conditions of the system are shown in TABLE 1.

TABLE 1

Effect of γ on steady-state performance with k = 0 in case study 1

| | t (sec) | x (cm) | y (cm) | φ (deg) | θ₁ (deg) | θ₂ (deg) | θ₃ (cm) |
|---|---|---|---|---|---|---|---|
| γ = 0.0 | 2.0 | 399.7 | 99.9 | 90.0 | −0.07 | 89.9 | 299.6 |
| γ = 0.1 | 2.0 | 383.8 | 82.0 | 97.3 | −8.2 | 74.4 | 258.0 |
| γ = 1.0 | 2.0 | 330.3 | 48.6 | 114.6 | −15.9 | 49.5 | 169.1 |

It is seen that when $\gamma=0$, the tip x and y coordinates and the elbow angle $\phi$ track the desired trajectories accurately and reach the specified target values in one second. When the cart velocity weighting $\gamma$ is increased to 0.1 and 1, the task-space tracking performance is degraded yielding steady-state errors; however, the required cart velocity is now smaller and the cart motion is reduced substantially, with higher $\gamma$ yielding lower velocity, as expected. Therefore, there is a trade-off between the task performance and the cart motion.

Case 2—Effect of k: In this case, we set $\gamma=1$ and solve Equation (28) under three different conditions k=0, 1, 10. The simulation results are presented in FIGS. 4a–4f and in TABLE 2.

TABLE 2

Effect of k on steady-state performance with γ = 1 in case study 1

| | t (sec) | x (cm) | y (cm) | φ (deg) | θ₁ (deg) | θ₂ (deg) | θ₃ (cm) |
|---|---|---|---|---|---|---|---|
| k = 0 | 2 | 330 | 49 | 115 | −16 | 49 | 169 |
| k = 1 | 2 | 358 | 75 | 105 | −9 | 66 | 218 |
| k = 10 | 2 | 399 | 99 | 91 | −0.6 | 89 | 297 |

It is seen that for k=0, the joint variables ($\theta_1$, $\theta_2$, $\theta_3$) cease motion at t=1 second and there are steady-state task-space tracking errors in x, y and $\phi$. When k is increased to 1 and 10, the joints continue to move after t=1 second until the task variables (x, y, $\phi$) converge to their target values ($x_f$, $y_f$, $\phi_f$). Note that the value of k determines the rate of convergence; with higher k yielding faster convergence.

Case Study 2: Spatial 2R-2P Mobile Robot

Figure 5:
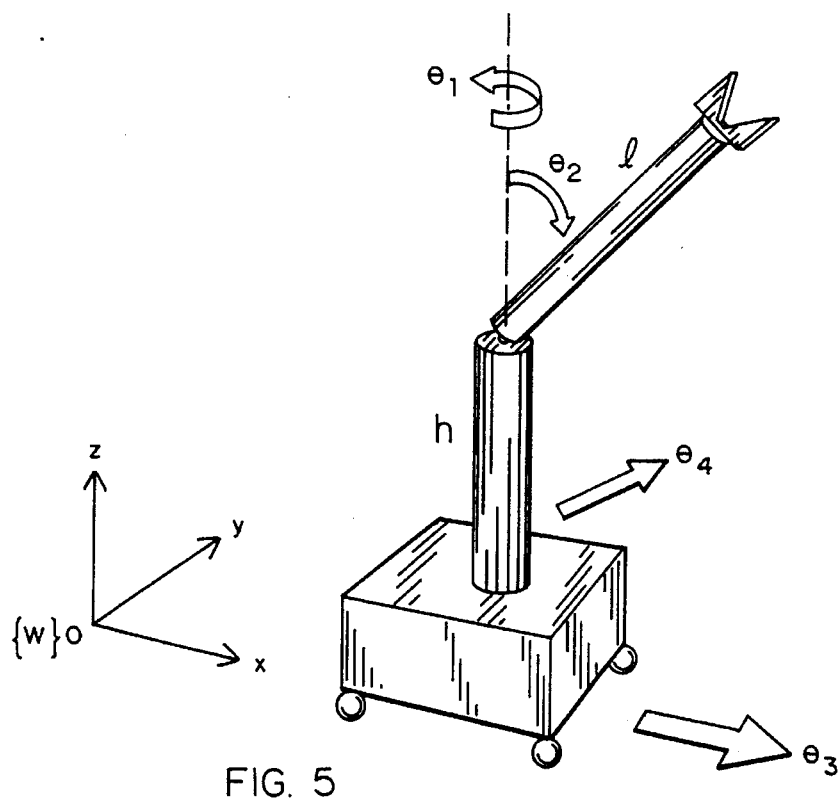
FIG. 5 illustrates a single-link robot arm mounted on a double axis movable vehicle to provide a pair of prismatic joints and a pair of revolute joints.

Consider the robot shown in FIG. 5 consisting of a single-link arm mounted on a vehicle with both Cartesian x and y translational motion and rotational motion $\phi$ capabilities. Let us denote the arm joint angle by $\theta_1$, the vehicle rotation by $\theta_2(=\phi)$, and let the prismatic joints $\theta_3$ and $\theta_4$ represent the two translational motions of the vehicle in x and y-directions. The forward kinematics equations describing the tip Cartesian coordinates $X=(x, y, z)^T$ relative to a fixed world frame are given by $$x = l \cos\theta_1 \sin\theta_2 + \theta_3 \quad y = l \sin\theta_1 \sin\theta_2 + \theta_4 \quad z = l \cos\theta_2 + h \quad (31)$$

where l is the arm length and h is the base height. The differential kinematic model is obtained from Equation (31) as $$\begin{pmatrix} \dot{x} \\ \dot{y} \\ \dot{z} \end{pmatrix} = \begin{pmatrix} -l\sin\theta_1\sin\theta_2 & l\cos\theta_1\cos\theta_2 & 1 & 0 \\ l\cos\theta_1\sin\theta_2 & l\sin\theta_1\cos\theta_2 & 0 & 1 \\ 0 & -l\sin\theta_2 & 0 & 0 \end{pmatrix} \begin{pmatrix} \dot{\theta}_1 \\ \dot{\theta}_2 \\ \dot{\theta}_3 \\ \dot{\theta}_4 \end{pmatrix} = J_e(\theta) \begin{pmatrix} \dot{\theta}_1 \\ \dot{\theta}_2 \\ \dot{\theta}_3 \\ \dot{\theta}_4 \end{pmatrix} \quad (32)$$

where $J_e(\theta)$ is the 3×4 tip Jacobian matrix. Since the robot has four joint coordinates ($\theta_1$, $\theta_2$, $\theta_3$, $\theta_4$) and only three Cartesian tip coordinates (x, y, z) to be controlled, it is kinematically redundant with the degree-of-redundancy one. This allows us to accomplish one additional task beside tip placement through redundancy resolution. Suppose that the additional task is defined as the optimization of some user-defined kinematic objective function $G(\theta)$. Then the condition for constrained optimization of $G(\theta)$ is given by Equations (13) and (14).

$$N_e \left[ \frac{\partial G}{\partial \theta_1}, \frac{\partial G}{\partial \theta_2}, \frac{\partial G}{\partial \theta_3}, \frac{\partial G}{\partial \theta_4} \right]^T = 0 \quad (33)$$

where $N_e$ is the 1×4 vector that spans the null-space of the tip Jacobian matrix $J_e$. This vector is found from the definition $N_e J_e^T = 0$ as $$N_e = [1, 0, l \sin\theta_1 \sin\theta_2, -l \cos\theta_1 \sin\theta_2] \quad (34)$$

Let us now choose the objective function $G(\theta)$ as a function of only the arm and vehicle rotational angles $\theta_1$ and $\theta_2$, i.e., $G=G(\theta_1, \theta_2)$. Then $$\frac{\partial G}{\partial \theta_3} = \frac{\partial G}{\partial \theta_4} = 0$$

and the optimality condition Equation (33) reduces to $$\frac{\partial G}{\partial \theta_1} = 0 \quad (35)$$

Therefore, in this case the constrained optimality condition for G, namely $$N_e \frac{\partial G}{\partial \theta} = 0,$$

reduces to the condition for unconstrained optimization of G over $\theta_1$, that is $$\frac{\partial G}{\partial \theta} = 0.$$

This makes physical sense since $\theta_2$ is fixed by the tip z-coordinate and $\theta_1$ can always be compensated by $\theta_3$ and $\theta_4$ motions to achieve desired tip x and y-coordinates. Now let us define the kinematic function $$\phi = \frac{\partial G}{\partial \theta_1}$$

and the desired value as $\phi_d=0$. Then $\dot{\phi}=J_c\dot{\theta}$, where $$J_c = \left[ \frac{\partial G}{\partial \theta_1}, \frac{\partial G}{\partial \theta_2}, \frac{\partial G}{\partial \theta_3}, \frac{\partial G}{\partial \theta_4} \right] = \left[ \frac{\partial^2 G}{\partial \theta_1^2}, \frac{\partial^2 G}{\partial \theta_2 \partial \theta_1}, 0, 0 \right]$$

The 4×4 augmented Jacobian matrix J is now given by $$J = \begin{pmatrix} J_e \\ \cdots \\ J_c \end{pmatrix} = \begin{pmatrix} -l\sin\theta_1\sin\theta_2 & l\cos\theta_1\cos\theta_2 & 1 & 0 \\ l\cos\theta_1\sin\theta_2 & l\sin\theta_1\cos\theta_2 & 0 & 1 \\ 0 & -l\sin\theta_2 & 0 & 0 \\ \frac{\partial^2 G}{\partial\theta_1^2} & \frac{\partial^2 G}{\partial\theta_2\partial\theta_1} & 0 & 0 \end{pmatrix} \quad (36)$$

The singularities of J are found from $$detJ = \left[\frac{\partial^2 G}{\partial\theta_1^2}\right][l\sin\theta_2] = 0 \quad (37)$$

Hence J is singular when $\theta_2=0$, 180 degrees, i.e., when the tip is right above or below the base, or $$\frac{\partial^2 G}{\partial\theta_1^2} = 0,$$

which is the condition for saddle point in unconstrained optimization of G over $\theta_1$. Note that $\theta_2=0$, 180 degrees is a tip singular configuration, since in this case we lose control of the tip z-coordinate and the tip is at the workspace boundary. By way of an example, let us suppose that the tip is in contact with a vertical wall parallel to y–z plane and is exerting the Cartesian force $$F = \begin{pmatrix} f_x \\ 0 \\ 0 \end{pmatrix}$$

on the wall. The joint torque required to produce the contact force F is given by $$\tau = J_e^T(\theta)F = \begin{pmatrix} -l\sin\theta_1\sin\theta_2 & l\cos\theta_1\sin\theta_2 & 0 \\ l\cos\theta_1\cos\theta_2 & l\sin\theta_1\cos\theta_2 & -l\sin\theta_2 \\ 1 & 0 & 0 \\ 0 & 1 & 0 \end{pmatrix}\begin{pmatrix} f_x \\ 0 \\ 0 \end{pmatrix} = \begin{pmatrix} -lf_x\sin\theta_1\sin\theta_2 \\ lf_x\cos\theta_1\cos\theta_2 \\ f_x \\ 0 \end{pmatrix} \quad (38)$$

Suppose that the additional task for redundancy resolution is defined as minimization of the revolute joint torque $\tau_1$, i.e.

$$G(\theta) = \tau_1^2 = (-lf_x \sin\theta_1 \sin\theta_2)^2 \quad (39)$$

In this case, we obtain $$\frac{\partial G}{\partial\theta_1} = 2(-lf_x\sin\theta_1\sin\theta_2)(-lf_x\cos\theta_1\sin\theta_2) = l^2f_x^2\sin2\theta_1\sin^2\theta_2$$

Hence, the optimality condition reduces to $$\phi(\theta) = \sin 2\theta_1 \sin^2\theta_2 = 0 \quad (40)$$

Therefore, the arm is in the optimal configuration when $\theta_1=0$, 90 degrees, 180 degrees, 270 degrees, 360 degrees or $\theta_2=0$, 180 degrees. The augmented Jacobian matrix is $$J = \begin{pmatrix} -l\sin\theta_1\sin\theta_2 & l\cos\theta_1\cos\theta_2 & 1 & 0 \\ l\cos\theta_1\sin\theta_2 & l\sin\theta_1\cos\theta_2 & 0 & 1 \\ 0 & -l\sin\theta_2 & 0 & 0 \\ 2\cos2\theta_1\sin^2\theta_2 & \sin2\theta_1\sin2\theta_2 & 0 & 0 \end{pmatrix} \quad (41)$$

with $$\det J = 2l\cos 2\theta_1 \sin^3\theta_2 \quad (42)$$

Hence, the singularities of the augmented Jacobian matrix are $\theta_1=45$ degrees, 135 degrees or $\theta_2=0$, 180 degrees. For the tip coordinates to track the desired trajectories $\{x_d(t), y_d(t), z_d(t)\}$ while minimizing the joint torque $\tau_1$, the required joint motions are obtained from $$\begin{pmatrix} \dot{x}_d \\ \dot{y}_d \\ \dot{z}_d \\ 0 \end{pmatrix} = \begin{pmatrix} -l\sin\theta_1\sin\theta_2 & l\cos\theta_1\cos\theta_2 & 1 & 0 \\ l\cos\theta_1\sin\theta_2 & l\sin\theta_1\cos\theta_2 & 0 & 1 \\ 0 & -l\sin\theta_2 & 0 & 0 \\ 2\cos2\theta_1\sin^2\theta_2 & \sin2\theta_1\sin2\theta_2 & 0 & 0 \end{pmatrix}\begin{pmatrix} \dot\theta_1 \\ \dot\theta_2 \\ \dot\theta_3 \\ \dot\theta_4 \end{pmatrix} \quad (43)$$

Equation (43) can be solved recursively using the closed-loop damped-least-squares method to find $\dot\theta$ at each time increment, and the solution is then integrated to obtain the required joint motion $\theta$, as in case study 1.

Case Study 3: Spatial 3R-1P Mobile Robot

Figure 6:
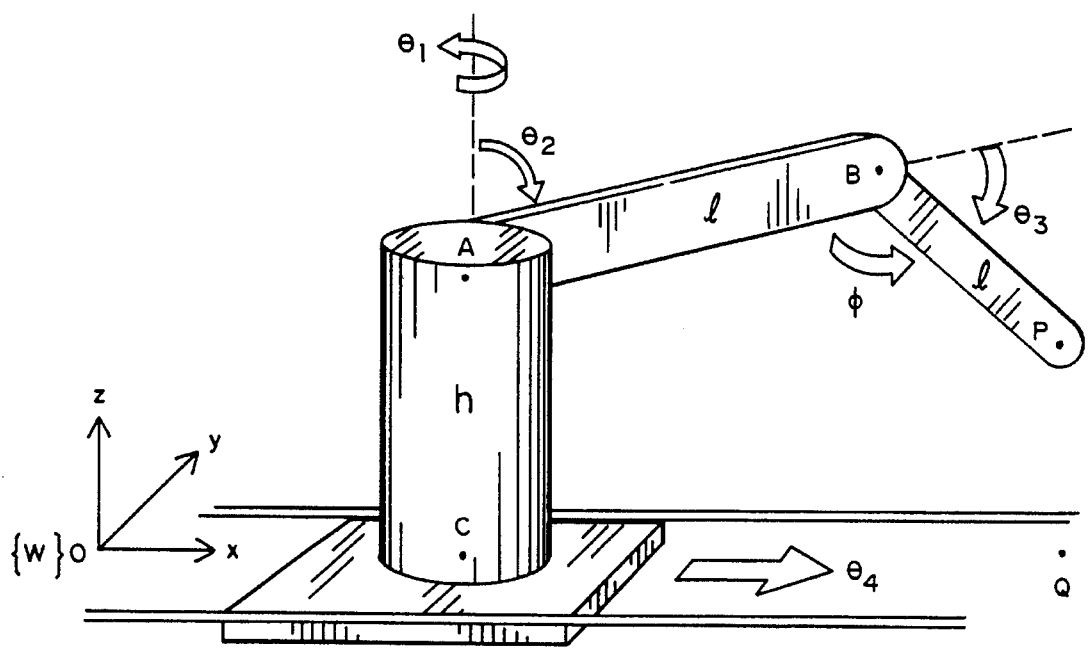
FIG. 6 illustrates a mobile robot having a spatial three-jointed arm on a one degree of freedom mobile platform providing a single prismatic joint and three revolute joints.
Figure 7A:
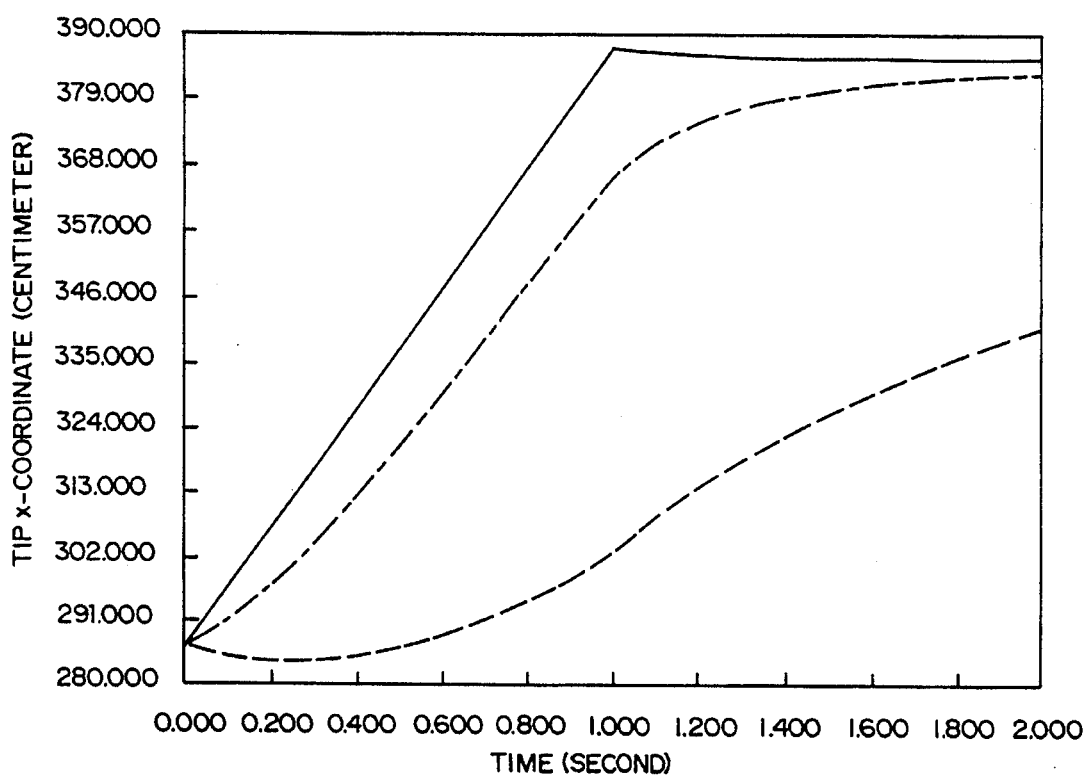
FIGS. 7(a) through 7(h), is a graphical illustration of a first computer simulation of the effects of three different velocity weighting factors on the robot of FIG. 6.
Figure 7B:
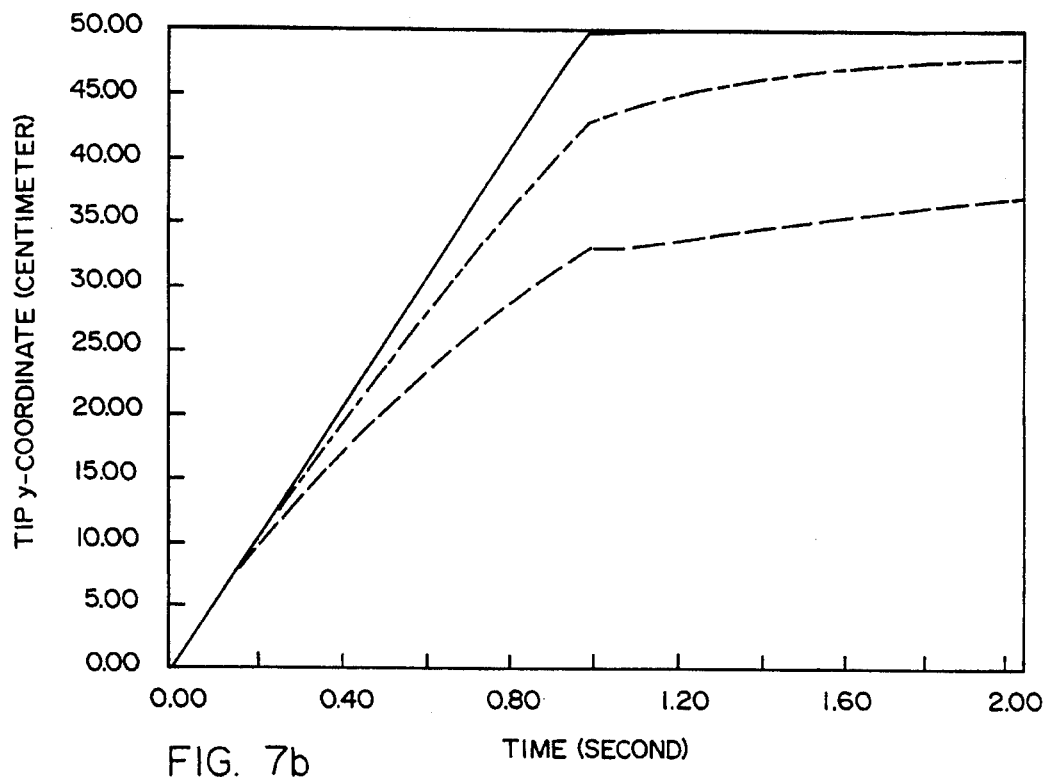
Figure 7C:
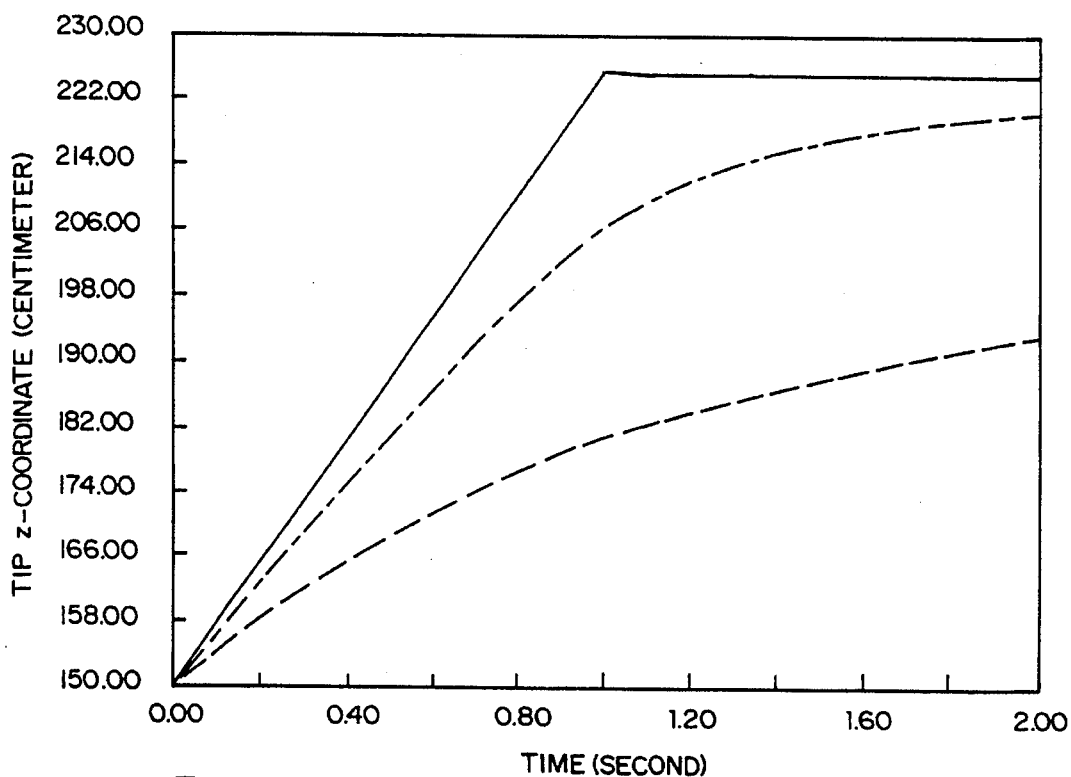
Figure 7D:
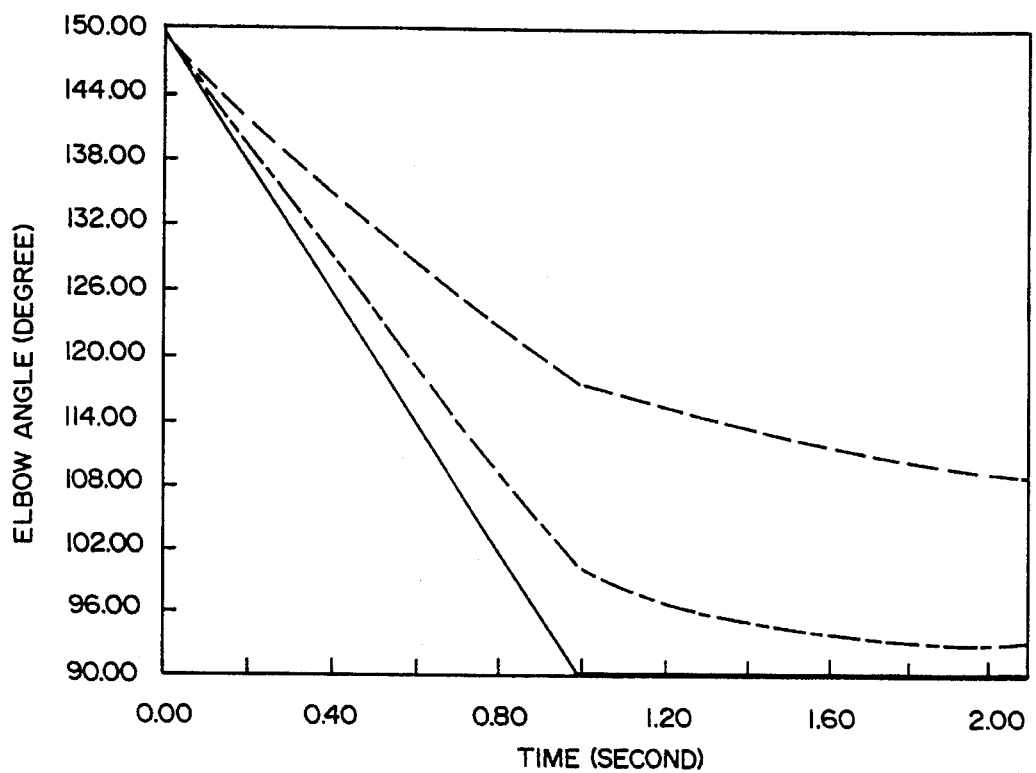
Figure 7E:
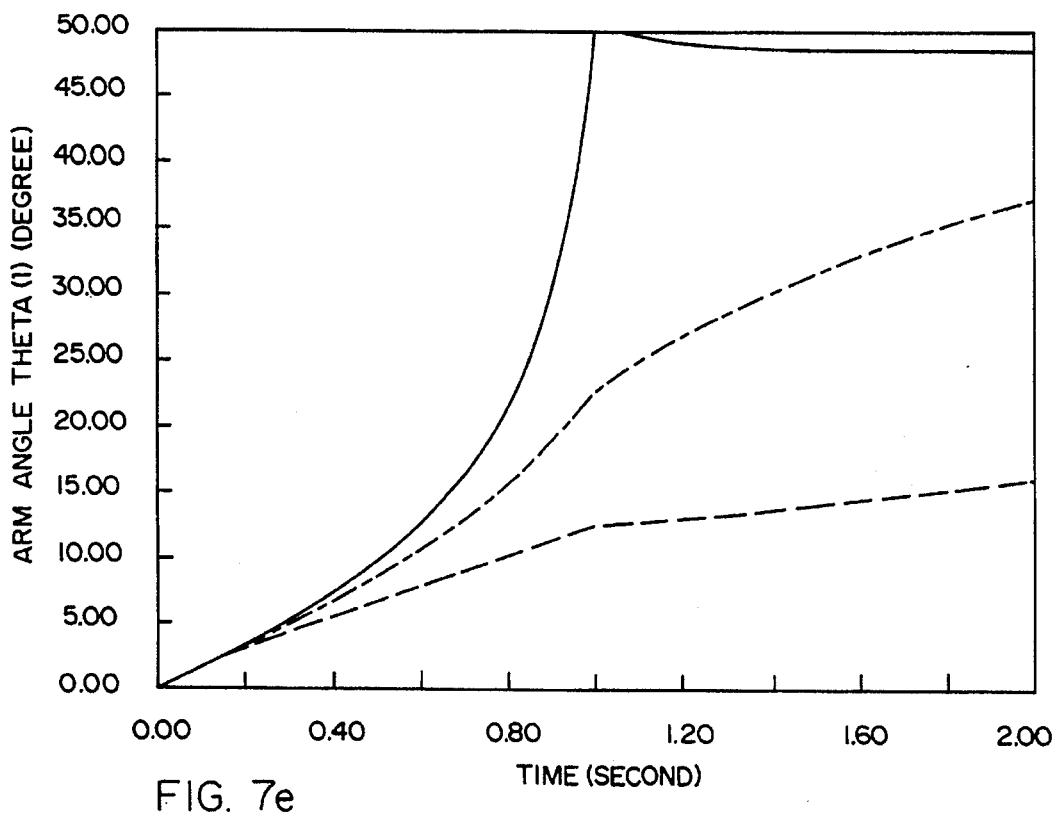
Figure 7F:
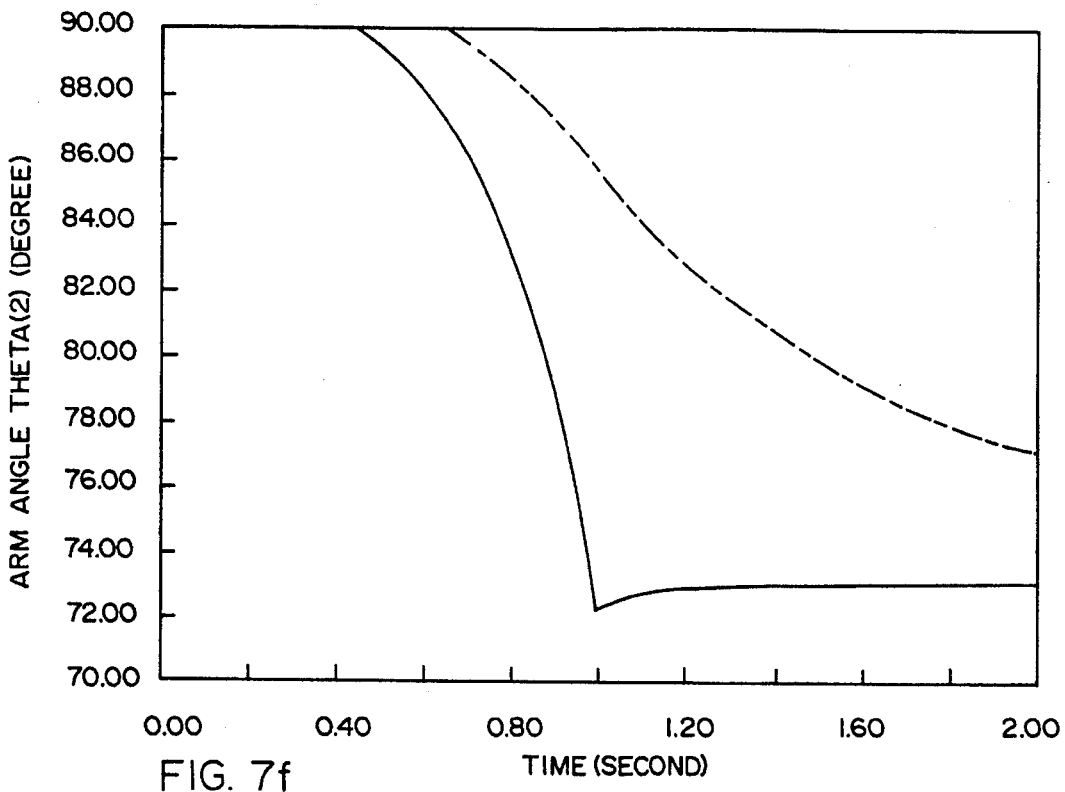
Figure 7G:
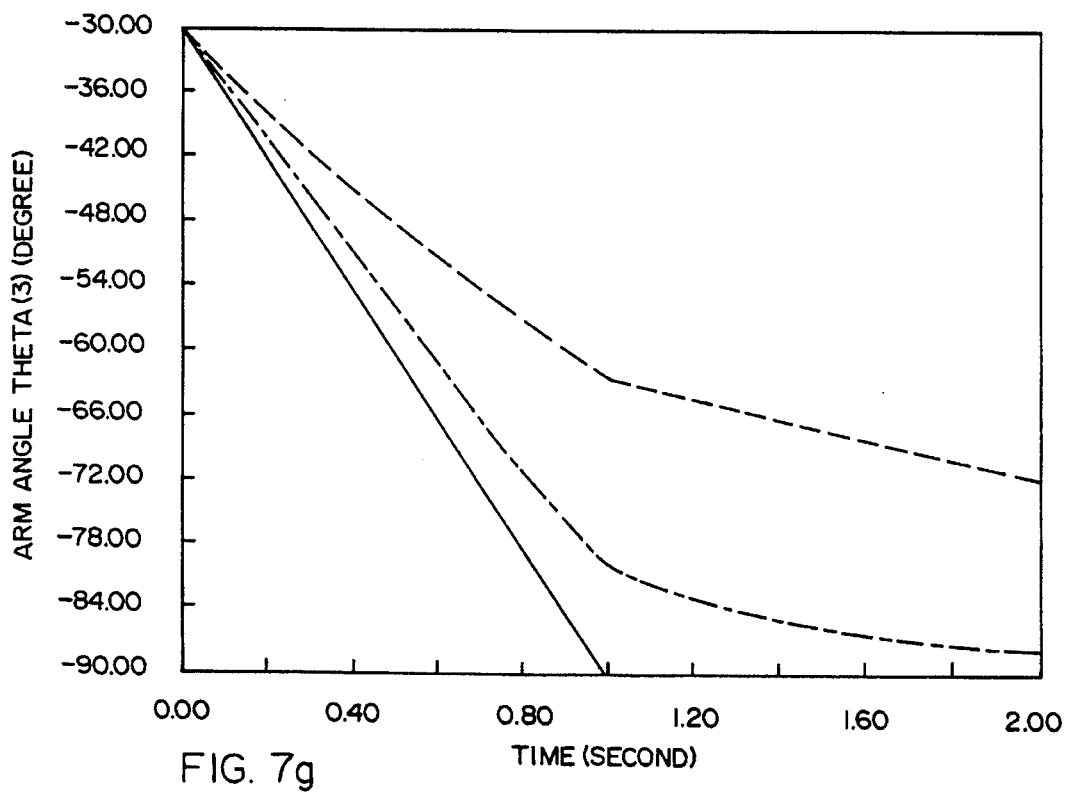
Figure 7H:
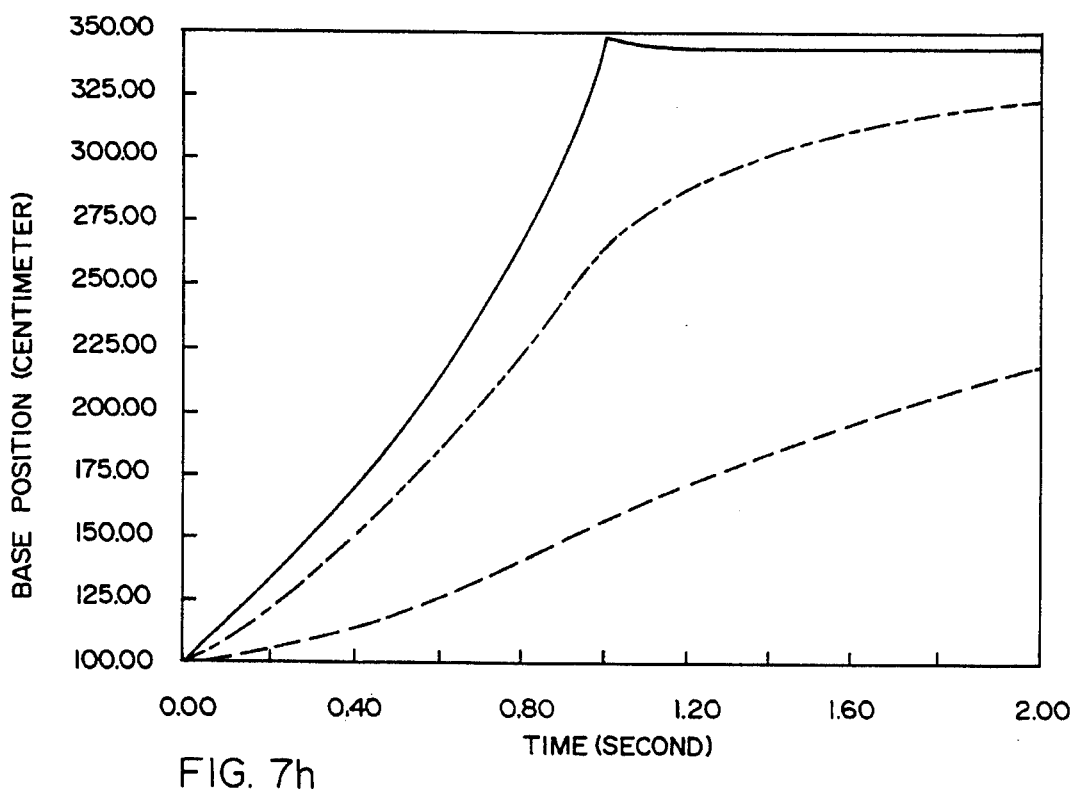
Figure 8A:
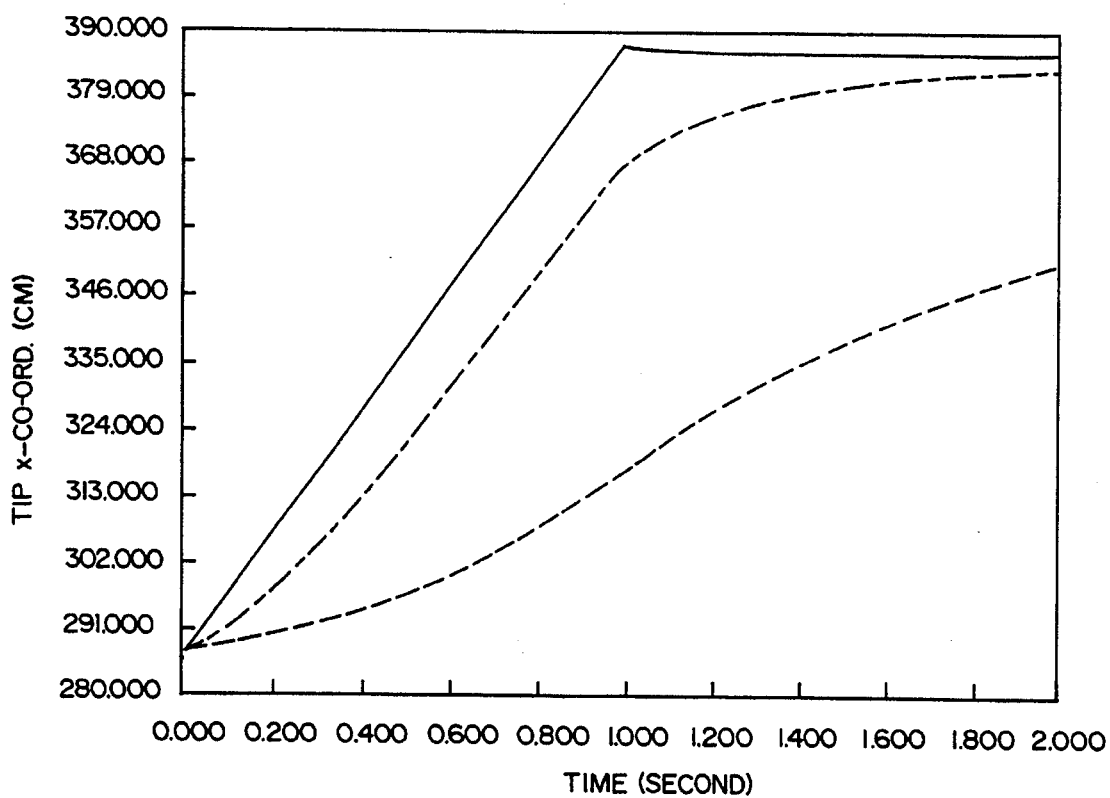
FIGS. 8(a) through 8(h), is a graphical illustration of a second computer simulation of the effects of three different velocity weighting factors on the robot of FIG. 6 where task weighting is varied as a function of velocity weighting.
Figure 8B:
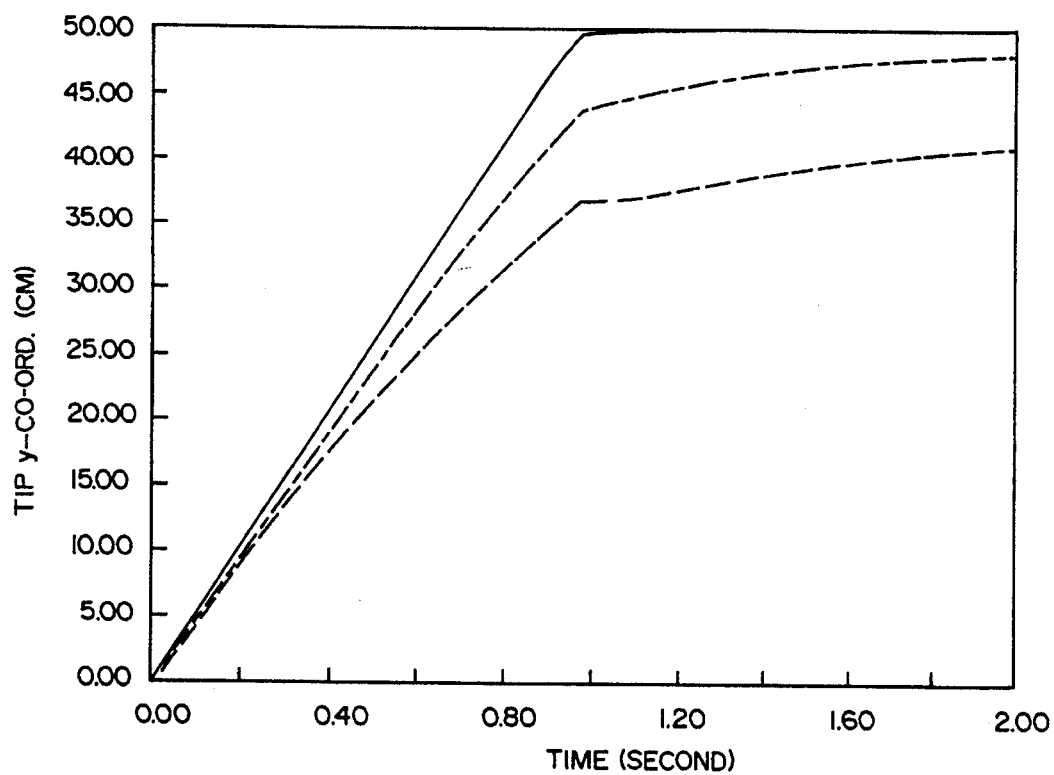
Figure 8C:
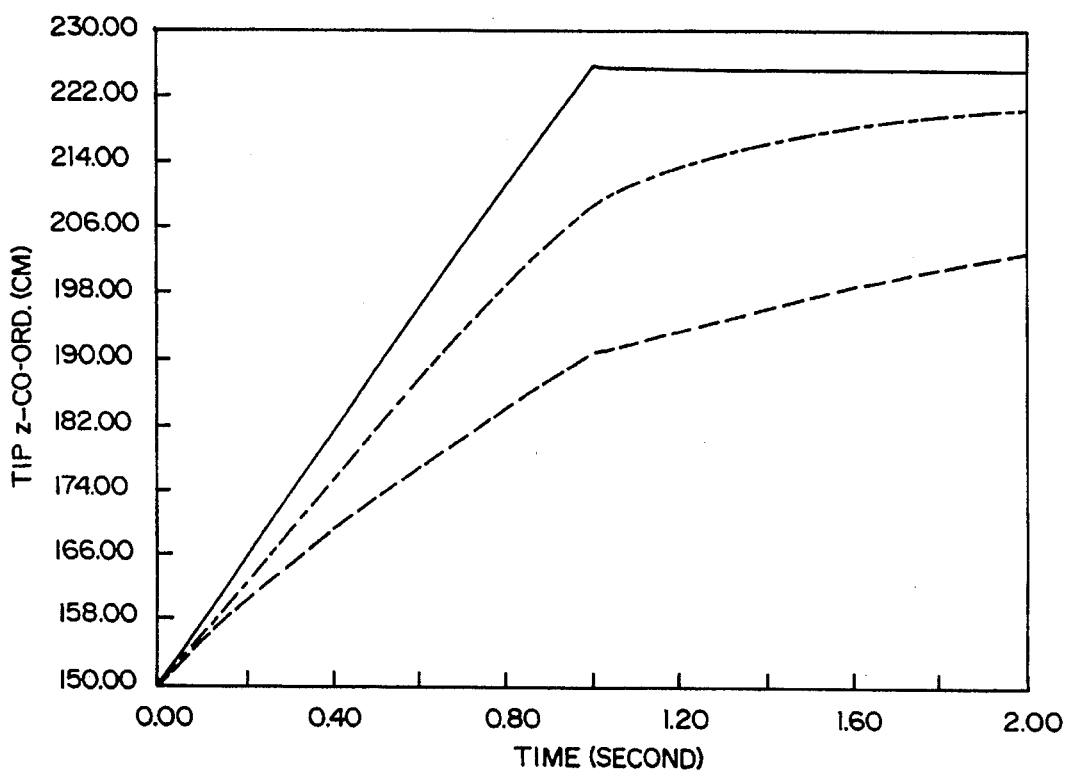
Figure 8D:
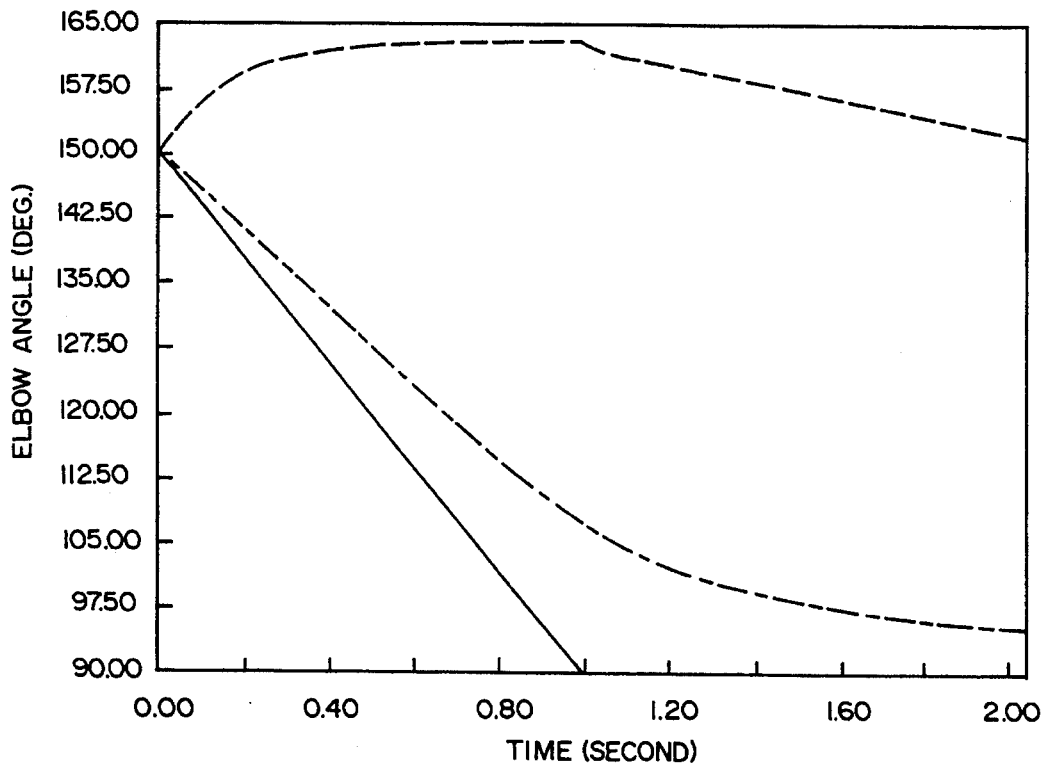
Figure 8E:
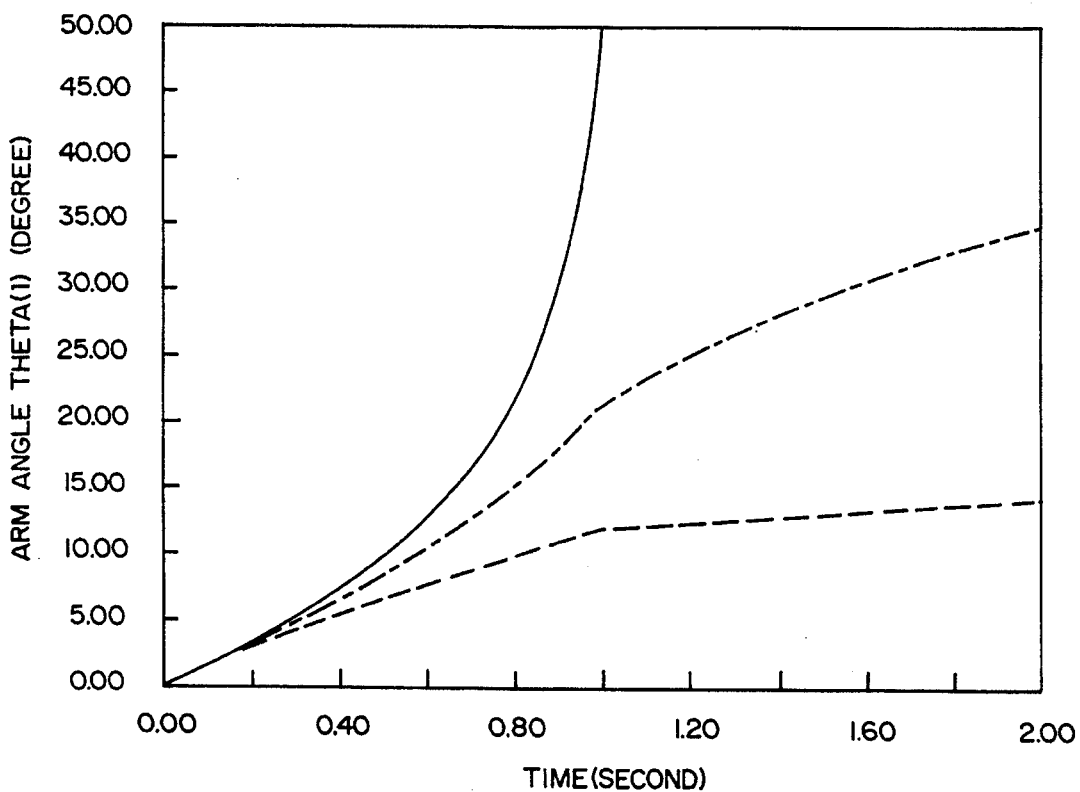
Figure 8F:
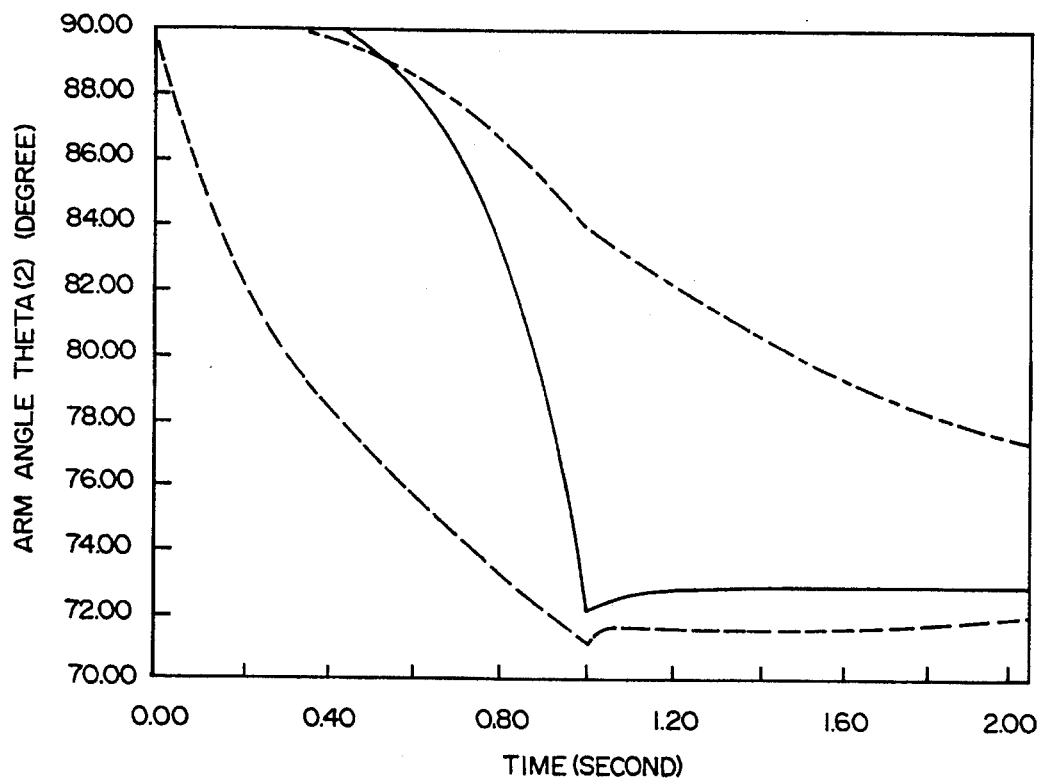
Figure 8G:
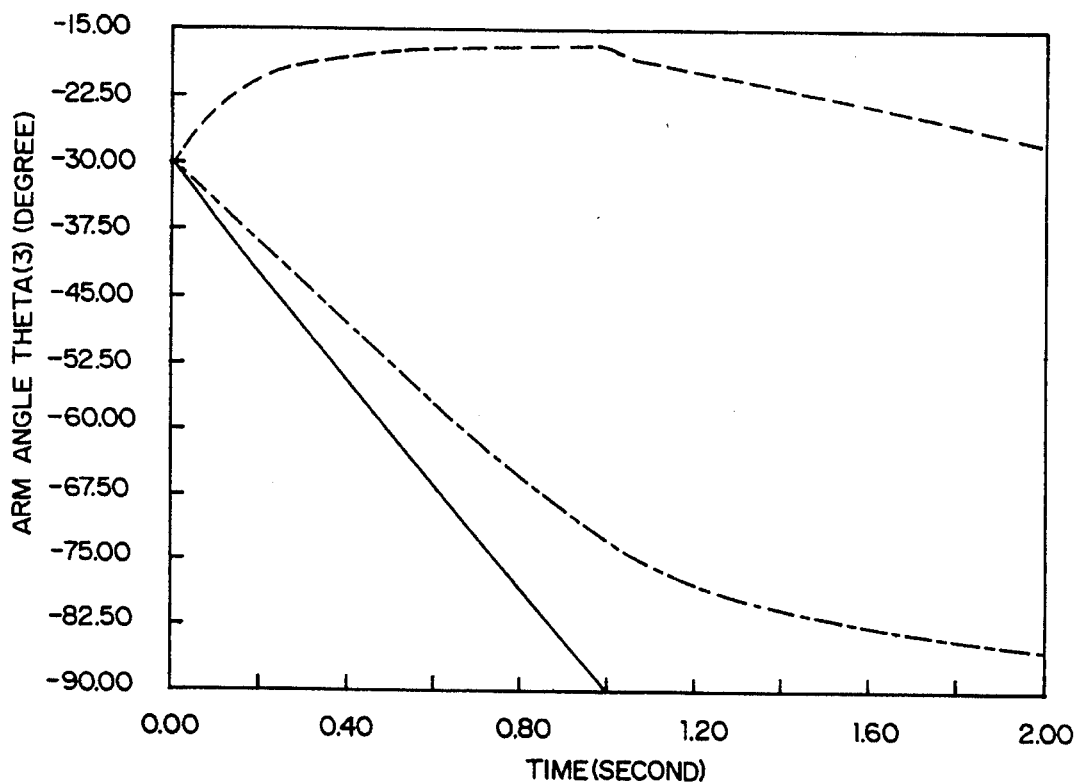
Figure 8H:
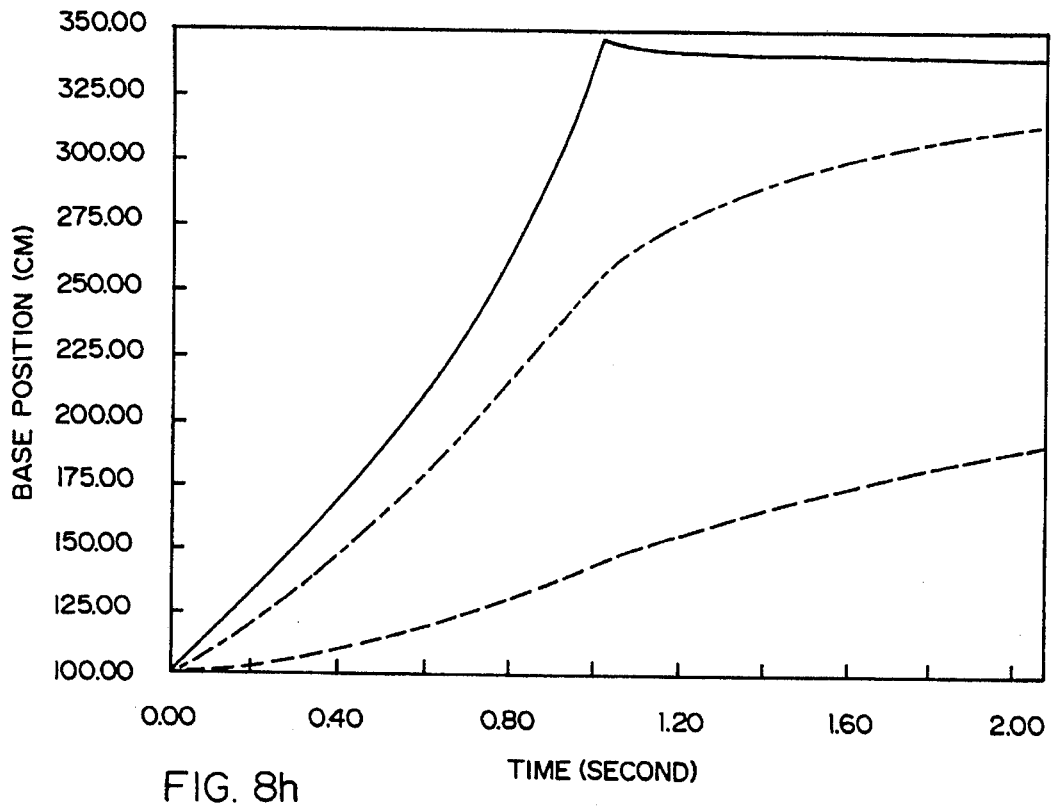

In this case study, we consider a spatial three-jointed arm on a one DOF mobile platform, as shown in FIG. 6. This resembles a PUMA robot (without wrist motions) mounted on a rail to obtain base mobility. Let us denote the waist joint by $\theta_1$, the shoulder joint by $\theta_2$, the elbow joint by $\theta_3$, and let $\theta_4$ represent the platform mobility in x-direction, treated as a prismatic joint. Let us first assume that the robot base is stationary, i.e., $\theta_4=0$. Then the forward kinematic model relating the joint angles $\theta=(\theta_1, \theta_2, \theta_3)^T$ to the tip Cartesian coordinates $Y=(x, y, z)^T$ in the reference world frame are readily found to be $$x=l\cos\theta_1[\sin\theta_2+\sin(\theta_2+\theta_3)] \quad y=l\sin\theta_1[\sin\theta_2+\sin(\theta_2+\theta_3)] \quad z=l\cos\theta_2+\cos(\theta_2+\theta_3)]+h \quad (44)$$

where h is the shoulder height and l is the length of the upper-arm or forearm, and is set to unity and simplicity. The differential kinematic model of the robot is $\dot{Y}_e = J(\theta)\dot\theta$, where the elements of the 3×3 hand Jacobian matrix are obtained from Equation (44) as $$J_{e11} = \frac{\partial x}{\partial\theta_1} = -\sin\theta_1[\sin\theta_2 + \sin(\theta_2 + \theta_3)];$$

$$J_{e12} = \frac{\partial x}{\partial\theta_2} = \cos\theta_1[\cos\theta_2 + \cos(\theta_2 + \theta_3)]$$

$$J_{e13} = \frac{\partial x}{\partial\theta_3} = \cos\theta_1\cos(\theta_2 + \theta_3);$$

$$J_{e21} = \frac{\partial y}{\partial\theta_1} = \cos\theta_1[\sin\theta_2 + \sin(\theta_2 + \theta_3)]$$

$$J_{e22} = \frac{\partial y}{\partial\theta_2} = \sin\theta_1[\cos\theta_2 + \cos(\theta_2 + \theta_3)];$$

$$J_{e23} = \frac{\partial y}{\partial\theta_3} = \sin\theta_1\cos(\theta_2 + \theta_3)$$

$$J_{e31} = \frac{\partial z}{\partial\theta_1} = 0;$$

$$J_{e32} = \frac{\partial z}{\partial\theta_2} = -\sin\theta_2 - \sin(\theta_2 + \theta_3);$$

$$J_{e33} = \frac{\partial z}{\partial\theta_3} = -\sin(\theta_2 + \theta_3)$$

The singular configurations of the arm are found from $$det[J] = \sin\theta_3[\sin\theta_2 + \sin(\theta_2 + \theta_3)] \quad (45)$$

as

I: $\sin\theta_3 = 0$ → $\theta_3 = 0$ arm fully extended
elbow singularity $\theta_3 = 180°$ arm fully folded
II: $\sin\theta_2 + \sin(\theta_2 + \theta_3) = 0$ → $x = y = 0$ hand is straight
shoulder singularity above the shoulder Note that case I singularities correspond to the hand on the outer ($\theta_3=0$) or inner ($\theta_3=180$ degrees) workspace boundary, and in case II the joint $\theta_1$ does not affect (x, y, z) of the hand and hence a joint DOF is ineffective. The above results are the classical singularities of the PUMA arm which are well-known and are repeated here for comparison with the mobile platform case.

Now, let us introduce base mobility to the system through the prismatic joint $\theta_4$. Since $\theta_4$ is along the x-axis, we obtain $$x = l \cos\theta_1 [\sin\theta_2 + \sin(\theta_2+\theta_3)] + \theta_4 \quad (46)$$

but y and z in Equation (44) are not affected. The new hand Jacobian $J_e$ will now be a 3×4 matrix with the fourth column as $$J_{e14} = \frac{\partial x}{\partial \theta_4} = 1; J_{e24} = \frac{\partial y}{\partial \theta_4} = 0; J_{e34} = \frac{\partial z}{\partial \theta_4} = 0 \quad (47)$$

Let us now consider the coordinated control of the arm and the platform. The robotic system in FIG. 6 is kinematically redundant since infinite combinations of joint motions $\theta(t)$ can produce the same tip trajectory Y(t). This redundancy can be resolved by picking out an appropriate solution from this infinite set that meets a user-defined additional task requirement. In this case study, we define the "elbow angle" $\phi$ between the upper-arm and forearm as the kinematic function to be controlled independently of the tip position for redundancy resolution. The elbow angle $\phi=180$ degrees+ $\theta_3$ determines the "reach" of the arm AP, since $$AP = l \sin\phi/2 + l \sin\phi/2 = 2 \sin\phi/2 \quad (48)$$

Hence by controlling $\phi$ we can directly influence the reach of the arm. By introducing the elbow angle $\phi$ as the fourth task variable, the forward and differential kinematic models of the robot are augmented by $$\phi(\theta) = 180° + \theta_3 \quad (49)$$

$$J_c(\theta) = \frac{\partial \phi}{\partial \theta} = [0, 0, 1, 0] \quad (50)$$

Hence, the 4×4 augmented Jacobian matrix relating the rate of change of task variables to the joint velocities has the following structure $$\begin{pmatrix} \dot{x} \\ \dot{y} \\ \dot{z} \\ \dot{\phi} \end{pmatrix} = \begin{pmatrix} J_{e11} & J_{e12} & J_{e13} & 1 \\ J_{e21} & J_{e22} & J_{e23} & 0 \\ 0 & J_{e32} & J_{e33} & 0 \\ 0 & 0 & 1 & 0 \end{pmatrix} \begin{pmatrix} \dot{\theta}_1 \\ \dot{\theta}_2 \\ \dot{\theta}_3 \\ \dot{\theta}_4 \end{pmatrix} = J \begin{pmatrix} \dot{\theta}_1 \\ \dot{\theta}_2 \\ \dot{\theta}_3 \\ \dot{\theta}_4 \end{pmatrix} \quad (51)$$

Notice that the Jacobian matrix J has a particular structure, with zero elements indicating that some joint angles have no effect on certain task variables. In order to control the task variables (x, y, z, $\phi$) independently, the augmented Jacobian matrix J must be nonsingular. The singularities of J are found from $$det[J] = -J_{e21}J_{e32} = \cos\theta_1[\sin\theta_2 + \sin(\theta_2+\theta_3)]^2 \quad (52)$$

Note that the simplicity of det[J] is a consequence of the particular structure of J. From Equation (52), it is seen that J is singular when:

I: $\cos\theta_1 = 0$ → $\theta_1 = 90°, 270°$ → $x = \theta_4$
base singularity
II: $\sin\theta_2 + \sin(\theta_2 + \theta_3) = 0$ → $x = \theta_4, y = 0$
shoulder singularity To investigate these singularities, we study the augmented Jacobian matrix in these singular configurations. At the singular condition I, the hand and the platform have the same x-coordinate, i.e., the hand-base line is perpendicular to the x-axis. In this case, we obtain $$J = \begin{pmatrix} -\sin\theta_2 - \sin(\theta_2+\theta_3) & 0 & 0 & 1 \\ 0 & \cos\theta_2 + \cos(\theta_2+\theta_3) & \cos(\theta_2+\theta_3) & 0 \\ 0 & -\sin\theta_2 - \sin(\theta_2+\theta_3) & -\sin(\theta_2+\theta_3) & 0 \\ 0 & 0 & 1 & 0 \end{pmatrix}$$

It is seen that the first and fourth columns of J are multiples of one another, and hence $\theta_1$ and $\theta_4$ have identical incremental effects on the task variables {x, y, z, $\phi$}. At the singular condition II, the hand is right above the base, and in this case we have $$J = \begin{pmatrix} 0 & \cos\theta_1[\cos\theta_2 + \cos(\theta_2+\theta_3)] & \cos\theta_1\cos(\theta_2+\theta_3) & 1 \\ 0 & \sin\theta_1[\cos\theta_2 + \cos(\theta_2+\theta_3)] & \sin\theta_1\cos(\theta_2+\theta_3) & 0 \\ 0 & 0 & -\sin(\theta_2+\theta_3) & 0 \\ 0 & 0 & 1 & 0 \end{pmatrix}$$

Since the first column of J is zero, $\theta_1$ has no instantaneous effect on any of the task variables {x, y, z, $\phi$} in this configuration.

In comparison with the previous case for the stationary-base robot, it is seen that the base mobility has alleviated the elbow singularity ($\sin\theta_3=0$), i.e., the arm is no longer singular when it is fully extended or fully folded. However, a new singularity has been introduced ($\cos\theta_1=0$) when the hand and base line up; which is not a classical PUMA singularity and is due to the additional task variable $\phi$. Note that if the platform position $\theta_4$ is chosen as the additional task variable instead of the elbow angle $\phi$, i.e., the platform position is commanded and controlled directly, then the augmented Jacobian becomes $$J = \begin{pmatrix} & & & \vdots & 1 \\ & J_e & & \vdots & 0 \\ & & & \vdots & 0 \\ \cdots & \cdots & \cdots & \vdots & \cdots \\ 0 & 0 & 0 & \vdots & 1 \end{pmatrix}$$

and $$\det J = \det J_e$$

hence, the PUMA classical singularities are encountered in this case.

Suppose that we specify desired motion trajectories for the hand coordinates ad the elbow angle as $X_d(t)=[x_d(t), y_d(t), z_d(t), \phi_d(t)]^T$. Then the required joint motions are obtained by solving the equation $$\begin{pmatrix} \dot{x}_d(t) \\ \dot{y}_d(t) \\ \dot{z}_d(t) \\ \dot{\phi}_d(t) \end{pmatrix} = \begin{pmatrix} -\sin\theta_1[\sin\theta_2 + \sin(\theta_2+\theta_3)] & \cos\theta_1[\cos\theta_2 + \cos(\theta_2+\theta_3)] & \cos\theta_1\cos(\theta_2+\theta_3) & 1 \\ \cos\theta_1[\sin\theta_2 + \sin(\theta_2+\theta_3)] & \sin\theta_1[\cos\theta_2 + \cos(\theta_2+\theta_3)] & \sin\theta_1\cos(\theta_2+\theta_3) & 0 \\ 0 & -\sin\theta_2 - \sin(\theta_2+\theta_3) & -\sin(\theta_2+\theta_3) & 0 \\ 0 & 0 & 1 & 0 \end{pmatrix} \begin{pmatrix} \dot{\theta}_1 \\ \dot{\theta}_2 \\ \dot{\theta}_3 \\ \dot{\theta}_4 \end{pmatrix} \quad (53)$$

The closed-loop damped-least-squares solution of Equation (53) that minimizes $$L = \|\dot{X}_d - J\dot{\theta}\|^2_{W_t} + \|\dot{\theta}\|^2_{W_v} \quad (54)$$

is given by $$\dot{\theta} = [J^T W_t J + W_v]^{-1} J^T W_t[\dot{X}_d + k(X_d - X)] \quad (55)$$

Suppose that initially, the arm joint angles are $\theta_1=0$ degrees, $\theta_2=90$ degrees, $\theta_3=-30$ degrees and the base is at $\theta_4=1.0$ meter relative to a fixed world frame; yielding the initial hand position $x_i=2.866$ meter, $y_i=0$ meter, $z_i=1.5$ meter and the initial elbow angle $\phi_i=150$ degrees. Let the target task-space arm configuration be specified as $x_f=3.866$ meter, $y_f=0.5$ meter, $z_f=2.25$ meter, and $\phi_f=90$ degrees in the world frame. This corresponds to the hand motion of $\|Y_f-Y_i\|=1.35$ meter in Cartesian space and the elbow angle change of $\phi_f-\phi_i=-60$ degrees. Notice that the target hand position is not attainable without base motion, i.e., $(x_f, y_f, z_f)$ is outside the arm workspace when the base is stationary at 1.0 meter. Motion trajectories are specified in task-space as $$x_d(t) = \begin{cases} x_i + \frac{x_f - x_i}{\tau} \cdot t & , \text{for } t \leq \tau \\ x_f & , \text{for } t > \tau \end{cases} ; \quad (56)$$

$$y_d(t) = \begin{cases} y_i + \frac{y_f - y_i}{\tau} \cdot t & , \text{for } t \leq \tau \\ y_f & , \text{for } t > \tau \end{cases} ;$$

$$z_d(t) = \begin{cases} z_i + \frac{z_f - z_i}{\tau} \cdot t & , \text{for } t \leq \tau \\ z_f & , \text{for } t > \tau \end{cases} ;$$

$$\phi_d(t) = \begin{cases} \phi_i + \frac{\phi_f - \phi_i}{\tau} \cdot t & , \text{for } t \leq \tau \\ \phi_f & , \text{for } t > \tau \end{cases}$$

where $\tau$ is the duration of motion. These trajectories produce a straight-line motion in Cartesian space from $(x_i, y_i, z_i)$ to $(x_f, y_f, z_f)$, since $$\frac{x - x_i}{x_f - x_i} = \frac{y - y_i}{y_f - y_i} = \frac{z - z_i}{z_f - z_i}.$$

To find out the required joint motions, we substitute the desired task velocities $$\dot{x}_d(t) = \begin{cases} \frac{x_f - x_i}{\tau} & t \leq \tau \\ 0 & t > \tau \end{cases} ; \quad \dot{y}_d(t) = \begin{cases} \frac{y_f - y_i}{\tau} & t \leq \tau \\ 0 & t > \tau \end{cases} \quad (57)$$

$$\dot{z}_d(t) = \begin{cases} \frac{z_f - z_i}{\tau} & t \leq \tau \\ 0 & t > \tau \end{cases} ; \quad \dot{\phi}_d(t) = \begin{cases} \frac{\phi_f - \phi_i}{\tau} & t \leq \tau \\ 0 & t > \tau \end{cases}$$

into Equation (53) and integrate the acquired solution given by Equation (55). The Jacobian matrix in Equation (53) is then updated and the procedure is repeated. In this case study, the trajectory duration $\tau$ is 1 second, the time increment $\Delta t$ is 0.01 second, the position feedback gain k is set to 10, and the units of $(x, y, z, \phi)$ are meters and radian.

Two computer simulation studies are performed to investigate the effects of the base velocity weighting $\alpha$ and the additional task weighting $\beta$ on the system performance, where $W_v=\text{diag}\{0, 0, 0, \alpha\}$ and $W_t=\text{diag}\{1, 1, 1, \beta\}$. Notice that in the cost function Equation (54), the arm joint velocities $(\theta_1, \theta_2, \theta_3)$ are not penalized and the task velocity error weightings for (x, y, z) are set equal to one.

Case 1—Effect of $\alpha$: In this case, we set $\beta=1$ and find the required joint motions for three different values of the base velocity weighting $\alpha=0, 1, 10$. FIGS. 7a–7h depict the computer simulation results and TABLE 3 summarizes the steady-state values.

TABLE 3

Effect of $\alpha$ on steady-state performance with $\beta = 1$ in case study 3

| | t (sec) | x (cm) | y (cm) | z (cm) | $\phi$ (deg) | $\theta_1$ (deg) | $\theta_2$ (deg) | $\theta_3$ (deg) | $\theta_4$ (cm) |
|---|---|---|---|---|---|---|---|---|---|
| $\alpha = 0$ | 2.0 | 386.6 | 250.0 | 25.0 | 90.0 | 49.1 | 72.9 | −90.0 | 343.3 |
| $\alpha = 1$ | 2.0 | 384.2 | 48.2 | 220.5 | 92.1 | 37.6 | 77.1 | −87.8 | 321.7 |
| $\alpha = 10$ | 2.0 | 341.8 | 37.3 | 193.2 | 108.7 | 16.3 | 90.7 | −71.3 | 214.0 |

It is seen that when $\alpha=0$, the configuration variables (x, y, z, $\phi$) track the desired trajectories and reach the target values in t=1 second. For $\alpha=1$ and $\alpha=10$, the task-space tracking performance is degraded, but the joints continue to move after t=1 second until the target values are reached ultimately. However, due to the penalty imposed on the base motion, the base moves slower and by a smaller amount in this case. Notice that a higher value for $\alpha$ results in less base motion but a poorer task-space tracking performance.

Case 2—Effect of $\alpha$ and $\beta$: In this case, we choose $\beta$ a function of $\alpha$ so that as we impose penalty on the base motion, we also relax the additional task constraint. This suggests that β must be an inverse function of α, and here we choose a simple function as $\beta=1/(\alpha+1)$. Equation (55) is now solved for three different values of the base velocity weighting $\alpha=0, 1, 10$ with corresponding elbow angle weighting $\beta=1, 0.5, 0.091$. The simulation results are shown in FIGS. 8a–8h, and the steady-state values are given in TABLE 4.

TABLE 4

Effect of α and β on steady-state performance in case study 3

| | t (sec) | x (cm) | y (cm) | z (cm) | φ (deg) | $\theta_1$ (deg) | $\theta_2$ (deg) | $\theta_3$ (deg) | $\theta_4$ (cm) |
|---|---|---|---|---|---|---|---|---|---|
| α = 0<br>β = 1 | 2.0 | 386.6 | 50.0 | 225.0 | 90.0 | 49.1 | 72.9 | −90.0 | 343.3 |
| α = 1<br>β = 1/2 | 2.0 | 383.9 | 48.2 | 220.5 | 94.3 | 35.2 | 77.6 | −85.7 | 315.5 |
| α = 10<br>β = 1/11 | 2.0 | 351.3 | 41.1 | 202.7 | 152.2 | 14.4 | 72.0 | −27.8 | 191.8 |

It is seen that as α increases and β decreases, the base motion is reduced but the task performance is also degraded. However, since the φ constraint is relaxed automatically in this case, we observe a better tracking performance in the hand coordinates (x, y, z), as compared to the previous case. Recall that since $(x_f, y_f, z_f)$ is outside the robot workspace if the base is stationary, base motion is necessary even if only hand motion is specified.

Case Study 4: Spatial 4R-1P Mobile Robot

Figure 9:
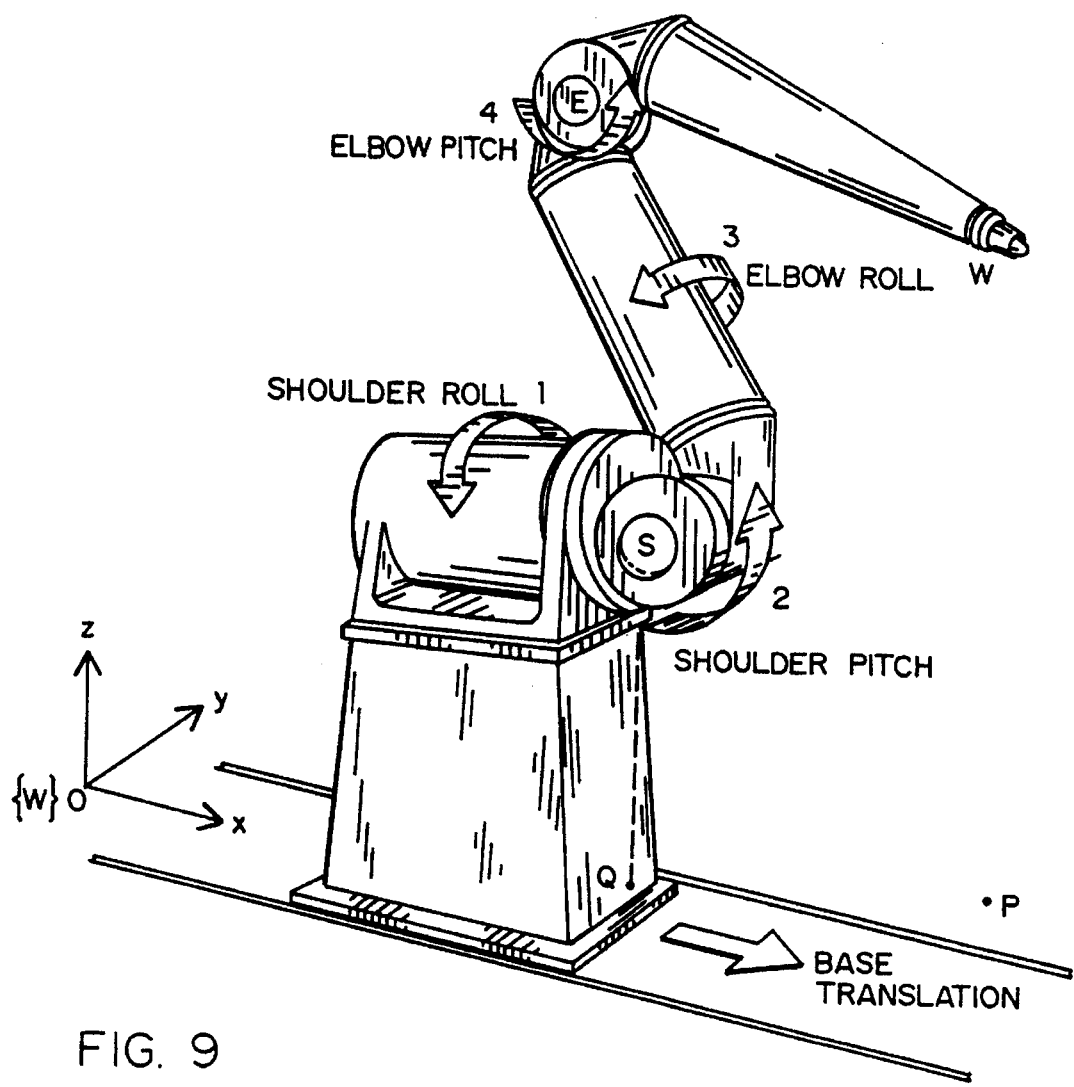
FIG. 9 illustrates a mobile robot having a spatial four revolute joint arm mounted on a single axis base treated as a single prismatic joint.

Consider a spatial 4R arm with roll and pitch shoulder joints $\theta_1, \theta_2$, and roll and pitch elbow joints $\theta_3, \theta_4$, mounted on a mobile platform as shown in FIG. 9, where the base motion along the x-axis is treated as a prismatic joint $\theta_5$. This robotic arm is analogous to the human arm which has 3 degrees-of-freedom at the shoulder and one joint at the elbow. Essentially, the 4R arm is obtained by adding the elbow roll motion $\theta_3$ to the conventional 3R PUMA arm geometry given in case study 3. The addition of the elbow roll enables the elbow to move out of the vertical plane and thus provides considerable dexterity and versatility in executing tasks that demand human-like manipulative capabilities. In fact, the presence of four joints on the arm enables independent control of the wrist Cartesian coordinates {x, y, z} as well as the arm angle ψ, defined as the angle between the plane passing through the arm and the vertical plane passing through the shoulder-wrist line. The forward kinematic model relating {x, y, z, ψ} to $\{\theta_1, \theta_2, \theta_3, \theta_4, \theta_5\}$ has been found to be $$x = c_1 s_2 + c_1 s_2 c_4 + s_4(c_1 c_2 c_3 - s_1 s_3) + \theta_5 \quad (58)$$
$$y = s_1 s_2 + s_1 s_2 c_4 + s_4(s_1 c_2 c_3 + c_1 s_3)$$
$$z = c_2 + c_2 c_4 - s_2 c_3 s_4 + d$$

$$\psi = \text{atan2}\left\{ s_2 s_3 s_4, \frac{s_4}{r}[c_2 s_4 + s_2 c_3(1 + c_4)] \right\} = \text{atan2}\{u, v\}$$

where u and v are the arguments of the atan2 function, $r=(2+2c_4)^{1/2}$ denotes the reach of the arm (i.e., the shoulder-wrist distance SW), h is the shoulder height, the upper-arm and forearm lengths are taken to be unity (SE=EW=1), the shoulder and elbow joints have zero offsets, and $s_i=\sin\theta_i$, $c_i=\cos\theta_i$. Note that when there is no elbow roll motion ($\theta_3=0$), we obtain ψ=0, i.e., the arm stays in the vertical place, Equation (58) reduces to Equation (44), and the PUMA robot in case study 3 is retrieved.

Since the robot system shown in FIG. 9 has five independent joint degrees-of-freedom, we can control another task variable in addition to {x, y, z, ψ}. In this case study, the additional task variable is chosen as the "elbow angle" φ formed between the upper-arm SE and the forearm EW, as in case study 3. The elbow angle φ is related to the joint angles by $$\phi = 180° + \theta_4 \quad (59)$$

and determines the reach of the arm. From triangle WEF, we obtain $$r = SW = 2l \sin\phi/2 = 2\sin\phi/2 \quad (60)$$

Figure 10:
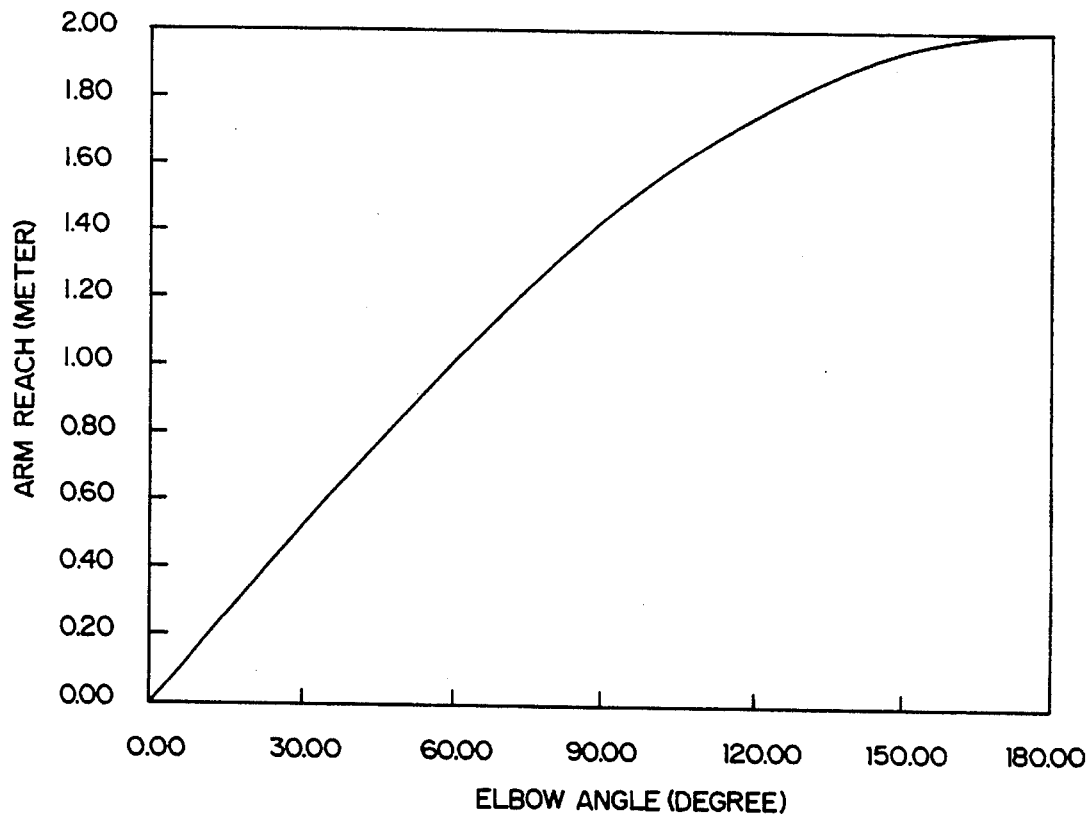
FIG. 10 is a graphical illustration of the variation of the arm reach as a function of elbow angle for the robot of FIG. 9.

Hence the arm reach r is a simple sinusoidal function of the elbow angle φ, and φ can be used to control r directly. This equation can also be obtained by applying the cosine law to the SEW triangle and using the half-angle cosine formula. Notice that the arm angle ψ and the elbow angle φ represent two independent configuration parameters for the arm. The radius of the circle traversed by the elbow when the arm is executing a self-motion (i.e., wrist is fixed) is a function of the elbow angle as EF=l cos φ/2. The variation of the arm reach r as a function of the elbow angle φ is shown in FIG. 10. It is seen that when φ changes in the range {0, 180 degrees}, r varies from 0 to 2; with r=0 at φ=0 (arm fully folded) and r=2 at φ=180 degrees (arm fully extended). Now let (x, y, z) represent the coordinates of the wrist and $\theta_5$ be the x-coordinate of the base. The shoulder-wrist distance SW is given by $$SW^2 = r^2 = 4\sin^2\phi/2 = (x-\theta_5)^2 + y^2 + (z-h)^2 \quad (61)$$

For a given wrist position W, the elbow angle φ is determined solely by the base location $\theta_5$. To attain a desired elbow angle $\hat{\Phi}$, the required base location is found from Equation (61) as $$\theta_5 = x \pm w \quad (62)$$

where $\omega^2 = 4\sin^2\phi/2 - y^2 - (z-h)^2$. Equation (62) gives two solutions for the platform position $\hat{\theta}_5$, given the desired elbow angle $\hat{\Phi}$. These solutions are symmetrical about the line perpendicular from W onto the x-axis.

Equations (58)–(59) represent the augmented forward kinematic model of the robot system. The augmented differential kinematic model relating the joint velocities $\{\theta_1, \theta_2, \theta_3, \theta_4, \theta_5\}$ to the resulting task variable velocities $\{\dot{x}, \dot{y}, \dot{z}, \dot{\psi}, \dot{\phi}\}$ is obtained by differentiating Equations (58)–(59) as $$\dot{X} = \begin{pmatrix} \dot{x} \\ \dot{y} \\ \dot{z} \\ \dot{\psi} \\ \dot{\phi} \end{pmatrix} =$$

$$\begin{pmatrix} J_{11} & J_{12} & J_{13} & J_{14} & . & 1 \\ J_{21} & J_{22} & J_{23} & J_{24} & . & 0 \\ 0 & J_{32} & J_{33} & J_{34} & . & 0 \\ 0 & J_{42} & J_{43} & J_{44} & . & 0 \\ \ldots & \ldots & \ldots & \ldots & . & \ldots \\ 0 & 0 & 0 & 1 & . & 0 \end{pmatrix} \begin{pmatrix} \dot{\theta}_1 \\ \dot{\theta}_2 \\ \dot{\theta}_3 \\ \dot{\theta}_4 \\ \dot{\theta}_5 \end{pmatrix} = J(\theta) \begin{pmatrix} \dot{\theta}_1 \\ \dot{\theta}_2 \\ \dot{\theta}_3 \\ \dot{\theta}_4 \\ \dot{\theta}_5 \end{pmatrix} \quad (63)$$

Because of the particular structure of the 5×5 augmented Jacobian matrix J, the expression for det[J] simplifies considerably to $$\det[J] = -J_{21}[J_{33}J_{42} - J_{32}J_{43}] \quad (64)$$

The elements of J that appear in Equation (63) can be obtained from Equation (58) as $$J_{21} = \frac{\partial y}{\partial \theta_1} = c_1s_2 + c_1s_2c_4 + c_1c_2c_3s_4 - s_1s_3s_4 = x - \theta_5$$

$$J_{32} = \frac{\partial z}{\partial \theta_2} = -s_2 - s_2c_4 - c_2c_3s_4 = -PQ$$

$$J_{33} = \frac{\partial z}{\partial \theta_3} = s_2s_3s_4$$

$$J_{42} = \frac{\partial \psi}{\partial \theta_2} = \frac{\partial \psi}{\partial u} \cdot \frac{\partial u}{\partial \theta_2} + \frac{\partial \psi}{\partial v} \cdot \frac{\partial v}{\partial \theta_2} =$$

$$\frac{1}{u^2 + v^2} \left[ v \frac{\partial v}{\partial \theta_2} - u \frac{\partial u}{\partial \theta_2} \right]$$

$$J_{43} = \frac{\partial \psi}{\partial \theta_3} = \frac{\partial \psi}{\partial u} \cdot \frac{\partial u}{\partial \theta_3} + \frac{\partial \psi}{\partial v} \cdot \frac{\partial v}{\partial \theta_3} =$$

$$\frac{1}{u^2 + v^2} \left[ v \frac{\partial v}{\partial \theta_3} - u \frac{\partial u}{\partial \theta_3} \right]$$

where $PQ = (x^2 + y^2)^{1/2}$ is the distance between the wrist projection on the x–y plane P and the robot base Q, and the partial derivatives in the above expressions are given by $$\frac{\partial u}{\partial \theta_2} = c_2s_3s_4; \quad \frac{\partial v}{\partial \theta_2} = \frac{s_4}{r} [-s_2s_4 + c_2c_3(1 + c_4)]$$

$$\frac{\partial u}{\partial \theta_3} = s_2c_3s_4; \quad \frac{\partial v}{\partial \theta_3} = \frac{s_4}{r} [-s_2s_3(1 + c_4)]$$

Substituting these expressions into Equation (64) and simplifying the result yields the surprisingly simple expression $$\det[J] = rs_2(\theta_5 - x) \quad (65)$$

This analysis shows that the arm-plus-platform system has the following singular configurations:

| | | | |
|---|---|---|---|
| I: | $\theta_5 - x = 0$ | $\rightarrow x = \theta_s$ | wrist and platform have the same x-coordinate |
| II: | $s_2 = 0$ | $\rightarrow \theta_2 = 0, 180°$ | upper-arm is vertical |
| III: | $r = 0$ | $\rightarrow \theta_4 = 180°$ | arm is fully folded |

In singular configuration I (i.e., $x = \theta_5$), the first and fifth columns of J are multiples and hence $\theta_1$ and $\theta_5$ have identical effects on the task variables. In singular configurations II and III (i.e., $s_2 = 0$ and $c_4 = -1$), the 2×2 submatrix $$\begin{pmatrix} J_{32} & J_{33} \\ J_{42} & J_{43} \end{pmatrix}$$

of J becomes rank-deficient, and hence the joint angles $\{\theta_2, \theta_3\}$ do not affect the task variables $\{z, \psi\}$ independently.

Suppose that the motion trajectories $X_d(t) = [x_d(t), y_d(t), z_d(t), \psi_d(t), \phi_d(t)]^T$ are specified for the task variables. Then the required joint motions can be obtained by finding the closed-loop damped-least-squares solution of $$\dot{X}_d = \begin{pmatrix} \dot{x}_d \\ \dot{y}_d \\ \dot{z}_d \\ \dot{\psi}_d \\ \dot{\phi}_d \end{pmatrix} = \begin{pmatrix} J_{11} & J_{12} & J_{13} & J_{14} & 1 \\ J_{21} & J_{22} & J_{23} & J_{24} & 0 \\ 0 & J_{32} & J_{33} & J_{34} & 0 \\ 0 & J_{42} & J_{43} & J_{44} & 0 \\ 0 & 0 & 0 & 1 & 0 \end{pmatrix} \begin{pmatrix} \dot{\theta}_1 \\ \dot{\theta}_2 \\ \dot{\theta}_3 \\ \dot{\theta}_4 \\ \dot{\theta}_5 \end{pmatrix} = J(\theta) \dot{\theta} \quad (66)$$

that minimizes the cost function $$L = \|\dot{X}_d - J\dot{\theta}\|_{W_t}^2 + \|\dot{\theta}\|_{W_v}^2$$

as $$\dot{\theta} = [J^T W_t J + W_v]^{-1} J^T W_t [\dot{X}_d + K(X_d - X)] \quad (67)$$

Typically, the pitch angle $\theta_4$ can vary in the range $-180$ degrees $\leq \theta_4 \leq 0$ degrees and hence the range of variation of the elbow angle $\phi$ is 0 degrees to 180 degrees. The most desirable elbow angle is $\phi = 90$ degrees, which corresponds to the pitch angle $\theta_4$ in mid-range and ensures that the arm is not in an over-stretched ($\phi \approx 180$ degrees) or an under-stretched ($\phi \approx 0$ degrees) configuration. The elbow condition $\phi = 90$ degrees can also be derived from another point of view. For the robot arm shown in FIG. 9, the upper-arm SE and forearm EW define the arm plane $\Delta$. The robot can be viewed as a two-link planar arm with joint rotations $\theta_2$ and $\theta_4$ which move the arm in the plane $\Delta$. The arm plane $\Delta$ can rotate about the shoulder roll axis by $\theta_1$ and about the upper-arm by $\theta_3$.

When the robot base is stationary ($\dot{\theta}_5 = 0$), the wrist attains maximum manipulability when $\theta_2 - \theta_4 = 90$ degrees, which is the classical two-link arm result. Hence ensuring that the elbow angle $\phi = 90$ degrees guarantees the optimality of the wrist manipulability in the arm plane $\Delta$ when $\dot{\theta}_5 = 0$.

Figure 11:
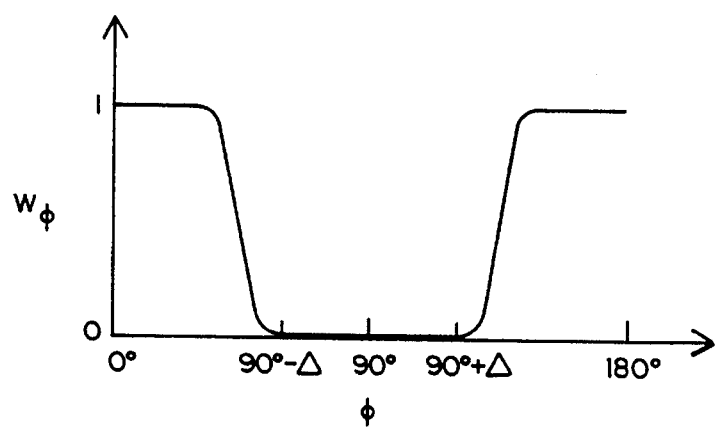
FIG. 11 is a graphical illustration of the variation of task weighting as a function of elbow angle for the robot of FIG. 9.

Having established the desirability of the $\phi = 90$ degrees condition based on the above arguments, the platform can be positioned continuously to attain the target elbow angle $\Phi = 90$ degrees while the wrist is executing the specified motion. Since the platform motion is often considerably slower than the arm movement, it is preferably not to move the platform continuously. To this end, instead of tracking the constraint $\phi = 90$ degrees accurately, we can impose the inequality constraint $$90° - \delta \leq \phi \leq 90° + \delta \quad (68)$$

where $\delta$ is a user-specified tolerance or margin. When the elbow angle $\phi$ is within the allowable bounds, the task weighting factor for $\phi$ is set to zero, and in this case base mobility will not be activated [unless the target wrist position is otherwise unattainable]. When $\phi$ is outside these bounds, i.e., $\phi > 90$ degrees $+\delta$ (arm over-stretched) or $\phi < 90$ degrees $-\delta$ (arm under-stretched), the task weighting for $\phi$ changes smoothly to one as shown in FIG. 11 and the platform is moved automatically to restore the optimal configuration $\phi = 90$ degrees, without perturbing the wrist position. Thus, the automatic motion of the platform prevents undesirable over-stretched or under-stretched arm configurations, while enabling the wrist to reach positions in the workspace that would otherwise be unattainable.

CONCLUSIONS

A simple scheme is disclosed for coordinating mobility and manipulation in a mobile robot system. The $n_b$ degrees-of-mobility are added to the $n_a$ degrees-of-manipulation, and the overall $n_a+n_b$ degrees-of-freedom (DOF) are used to accomplish a set of user-defined tasks in addition to end-effector motion. This formulation puts the mobility DOF on the same footing as the manipulation DOF and treats them equally within a common framework.

The key advantages of the present approach over the previous schemes are its flexibility, simplicity, and computational efficiency. The ability to change the task specifications and the task weighting factors on-line based on the user requirements provides a flexible framework for mobile robot control. Furthermore, in contrast to previous approaches which are suitable for off-line motion planning, the simplicity of the present approach leads to computational efficiency which is essential for on-line control in real-time implementations.

Having thus described a preferred embodiment of the invention, what is claimed is:

1. A method of controlling a mobile robot, the robot of the type having a mobile base having at least one degree of mobility and a manipulatable arm having at least one degree of manipulation; the method comprising the steps of:
    (a) generating a forward kinematic model that relates arm and base joint coordinates to end-effector coordinates;
    (b) generating a differential kinematic model that relates end-effector velocity to arm and base joint velocities including Jacobian matrices of the arm and base, respectively;
    (c) augmenting by column the arm Jacobian matrix with the base Jacobian matrix to obtain an overall end-effector Jacobian matrix where the availability of base mobility appears as extra columns in the end-effector Jacobian matrix because of effectively increasing the dimension of the joint space;
    (d) augmenting by row the end-effector Jacobian matrix of step (c) with a constraint Jacobian matrix which relates to a user-defined additional task to be accomplished due to kinematic redundancy where said additional task results in extra rows in the end-effector Jacobian matrix due to an increase of the task space;
    (e) selecting end-effector and constraint task weighting factors and arm and base joint velocity weighting factors;
    (f) finding the optimal arm and base motions using a closed-loop damped-least-squares approach; and
    (g) moving the arm and base of said robot in accordance with the optimal motions resulting from carrying out steps (a) through (f).

2. The method recited in claim 1 wherein said kinematic redundancy recited in step (d) results from a task space which is at least one dimension less than the sum of the revolute joints and prismatic joints of said robot.

3. The method recited in claim 1 wherein said mobile robot is a tracked robot.

4. The method recited in claim 1 wherein said mobile robot is a gantry robot.

5. The method recited in claim 1 wherein said mobile robot is a wheeled robot.

6. The method recited in claim 1 wherein said mobile robot is a compound robot.

7. The method recited in claim 1 wherein the number of degrees-of-freedom of said mobile robot is equal to the sum of the number of degrees-of-manipulation of said arm and the number of degrees-of-mobility of said base.

8. The method recited in claim 1 wherein said end-effector and constraint task weighting factors are selected on-line based on user requirements for real-time implementation of on-line control of said mobile robot.

9. A method for on-line, real-time control of a mobile robot having a mobile base and a manipulatable arm mounted on the base to provide a number of degrees-of-freedom equal to the sum of the number of degrees-of-base-mobility and the number of degrees-of-arm-manipulation, the robot operating in a multi-dimension task space wherein the number of task-space-dimensions is less than the degrees-of-freedom; the method comprising the steps of:
    (a) generating a forward kinematic model that relates arm and base joint coordinates to end-effector coordinates;
    (b) generating a differential kinematic model that relates end-effector velocity to arm and base joint velocities including Jacobian matrices of the arm and base, respectively;
    (c) augmenting by column the arm Jacobian matrix with the base Jacobian matrix to obtain an overall end-effector Jacobian matrix where the availability of base mobility appears as extra columns in the end-effector Jacobian matrix because of effectively increasing the dimension of the joint space;
    (d) augmenting by row the end-effector Jacobian matrix of step (c) with a constraint Jacobian matrix which relates to a user-defined additional task to be accomplished due to kinematic redundancy where said additional task results in extra rows in the end-effector Jacobian matrix due to an increase of the task space;
    (e) selecting end-effector and constraint task weighting factors and arm and base joint velocity weighting factors;
    (f) finding the optimal arm and base motions using a closed-loop damped-least-squares approach; and
    (g) moving the arm and base of said robot in accordance with the optimal motions resulting from carrying out steps (a) through (f).

10. The method recited in claim 9 wherein said kinematic redundancy recited in step (d) results from a task space which is at least one dimension less than the sum of the revolute joints and prismatic joints of said robot.

11. The method recited in claim 9 wherein said mobile robot is a tracked robot.

12. The method recited in claim 9 wherein said mobile robot is a gantry robot.

13. The method recited in claim 9 wherein said mobile robot is a wheeled robot.

14. The method recited in claim 9 wherein said mobile robot is a compound robot.

* * * * *